July 2, 1935.  A. L. BAUSMAN  2,006,432
APPARATUS FOR DECORATING CONFECTIONS
Filed July 10, 1933    13 Sheets-Sheet 8
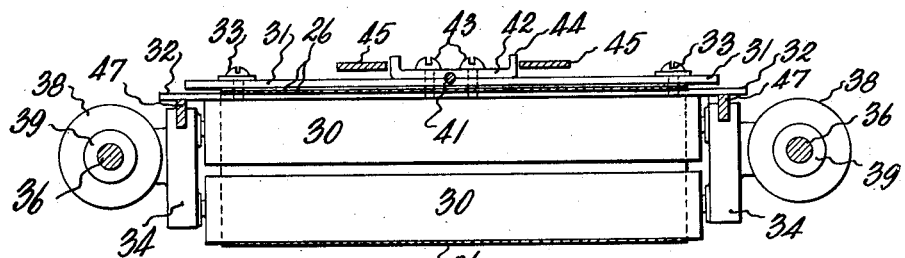
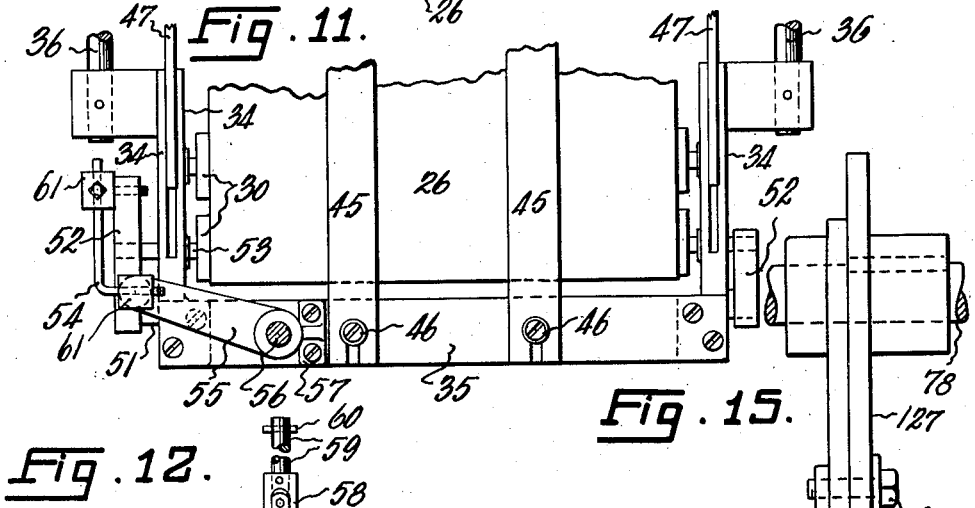
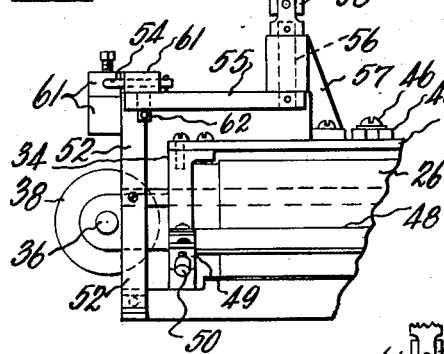
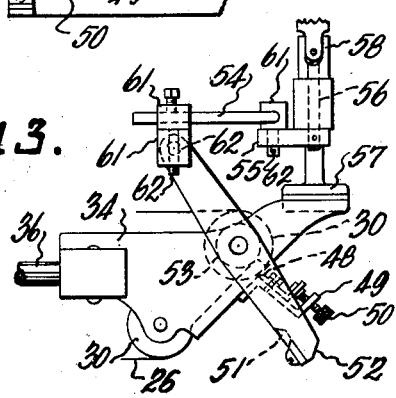
INVENTOR
ALONZO LINTON BAUSMAN
BY Chapin + Neal
ATTORNEYS

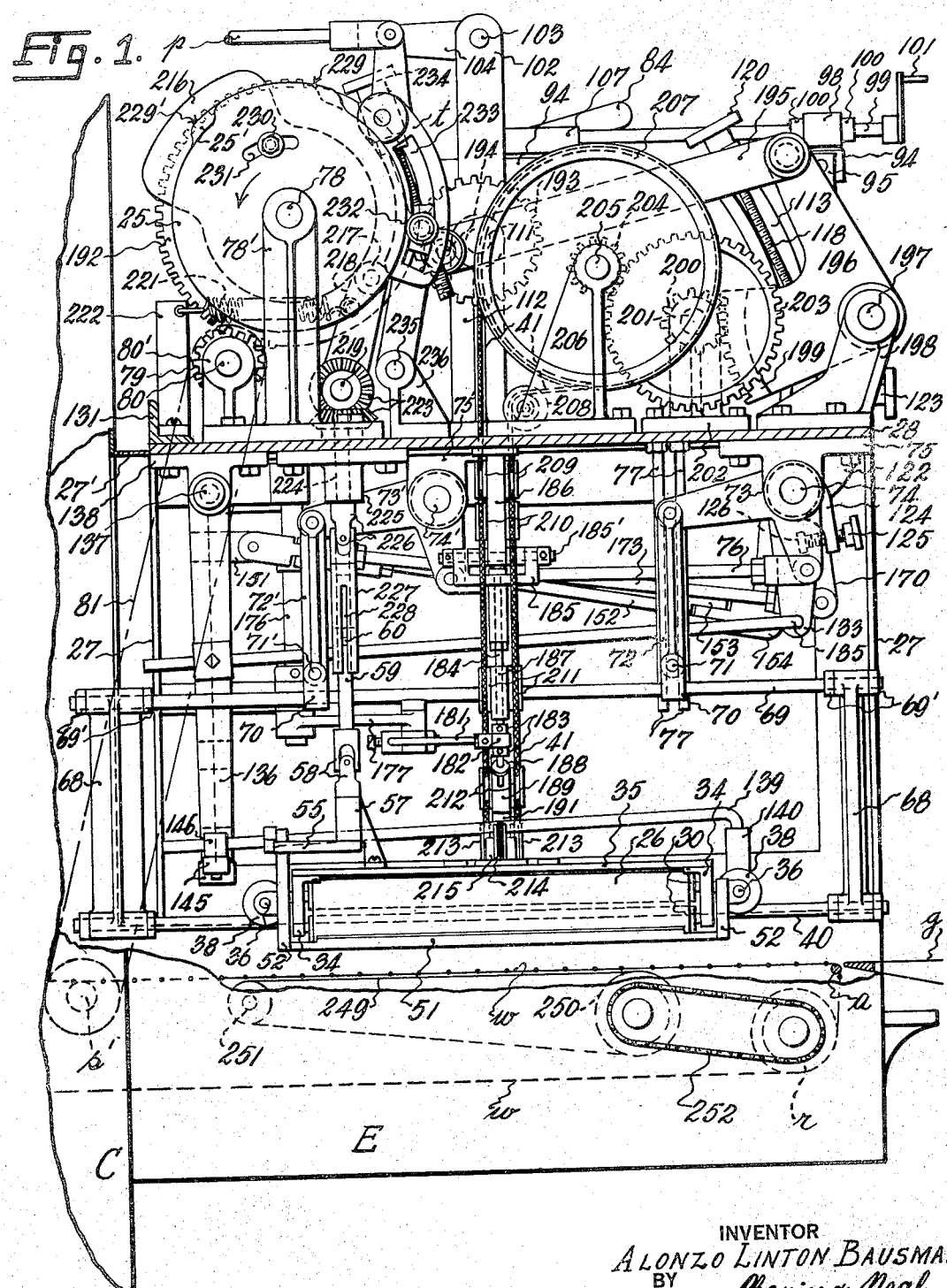

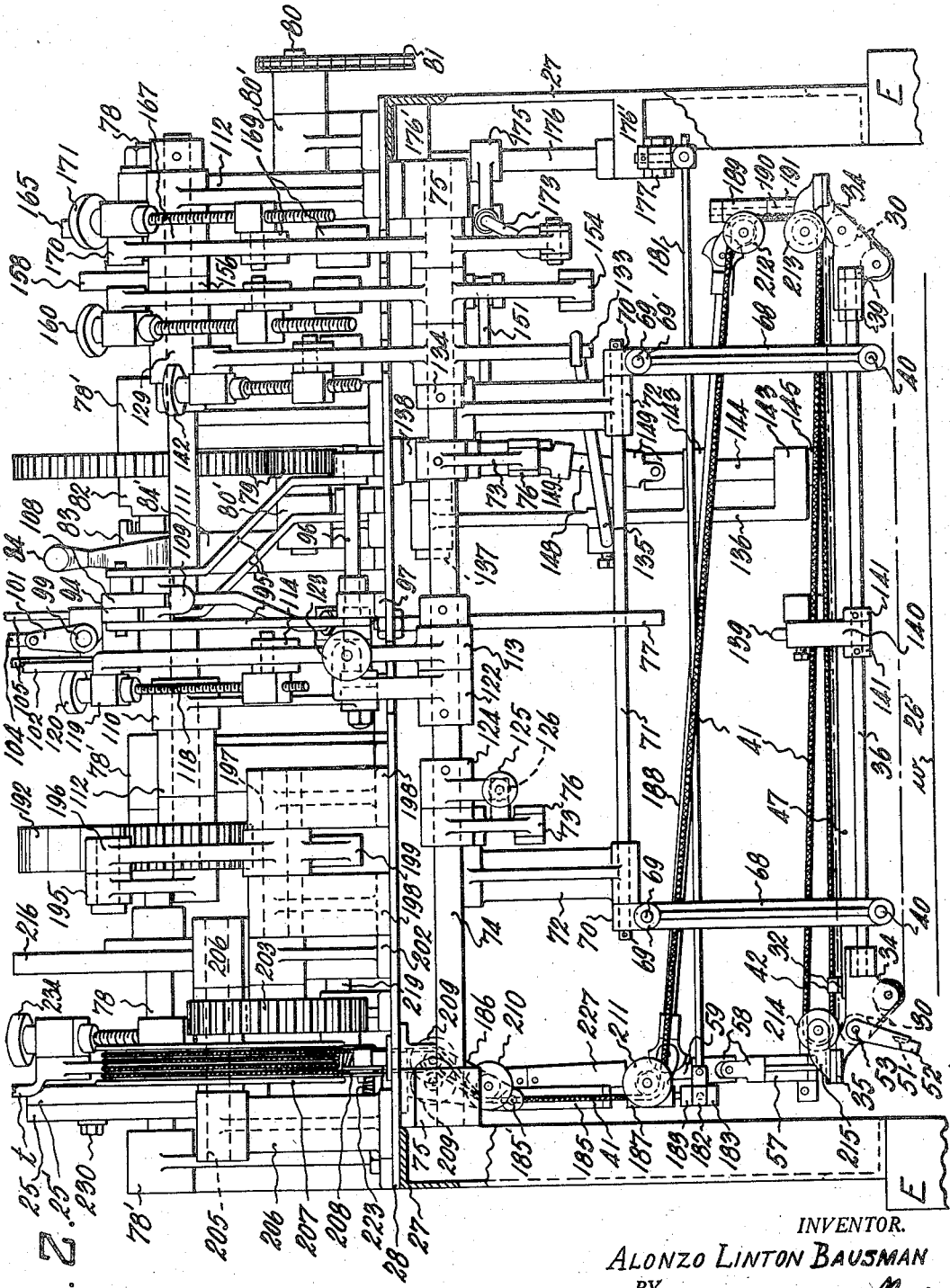

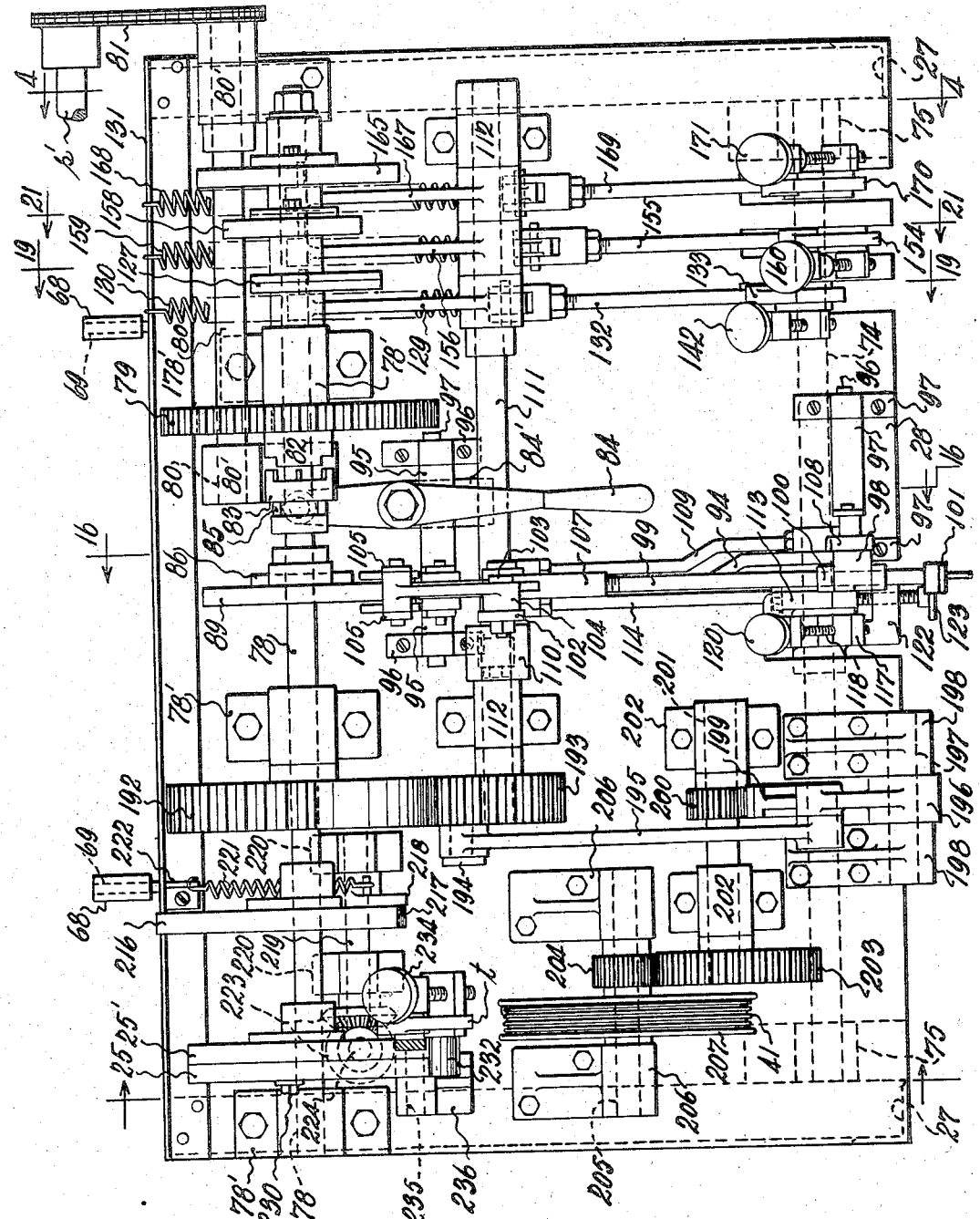

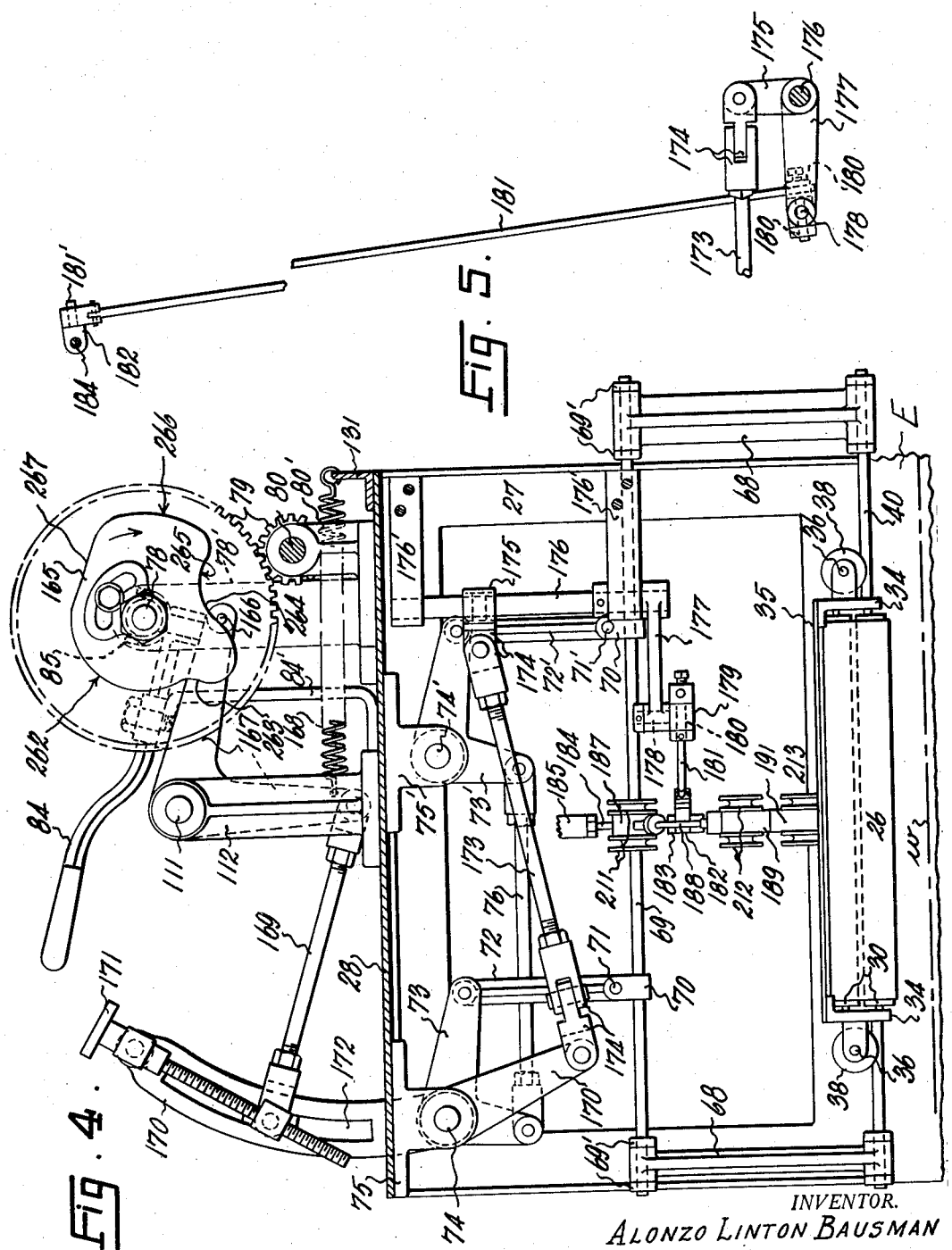

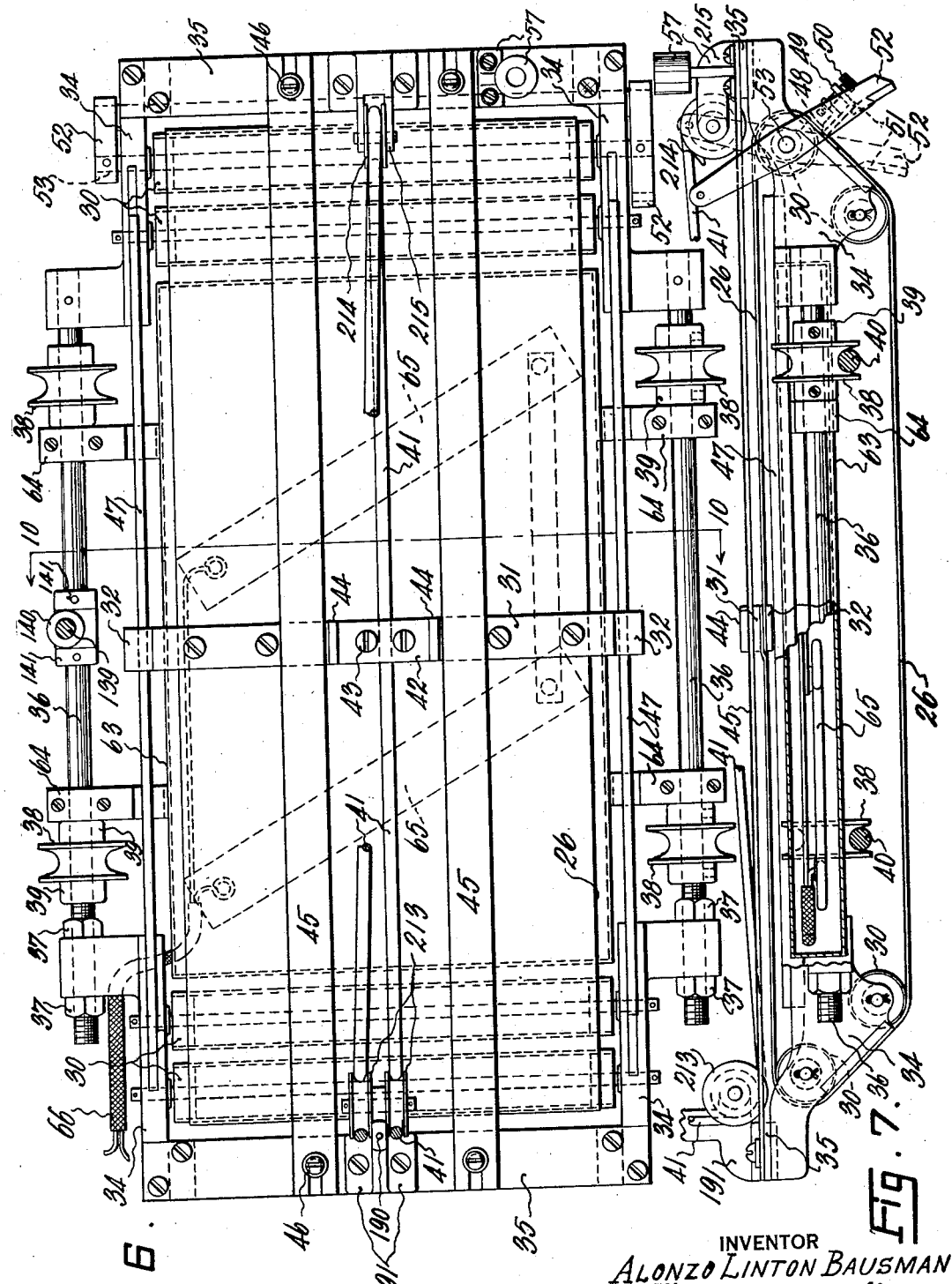

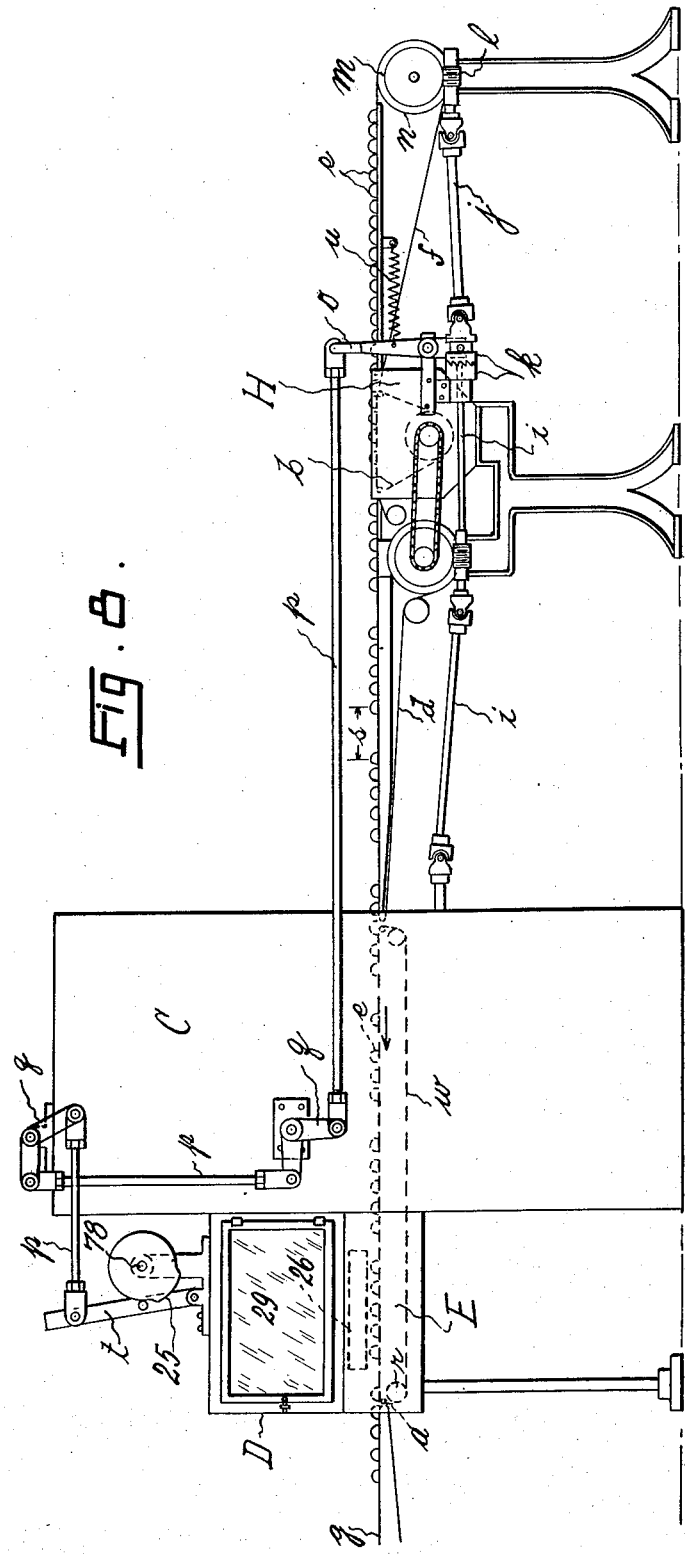

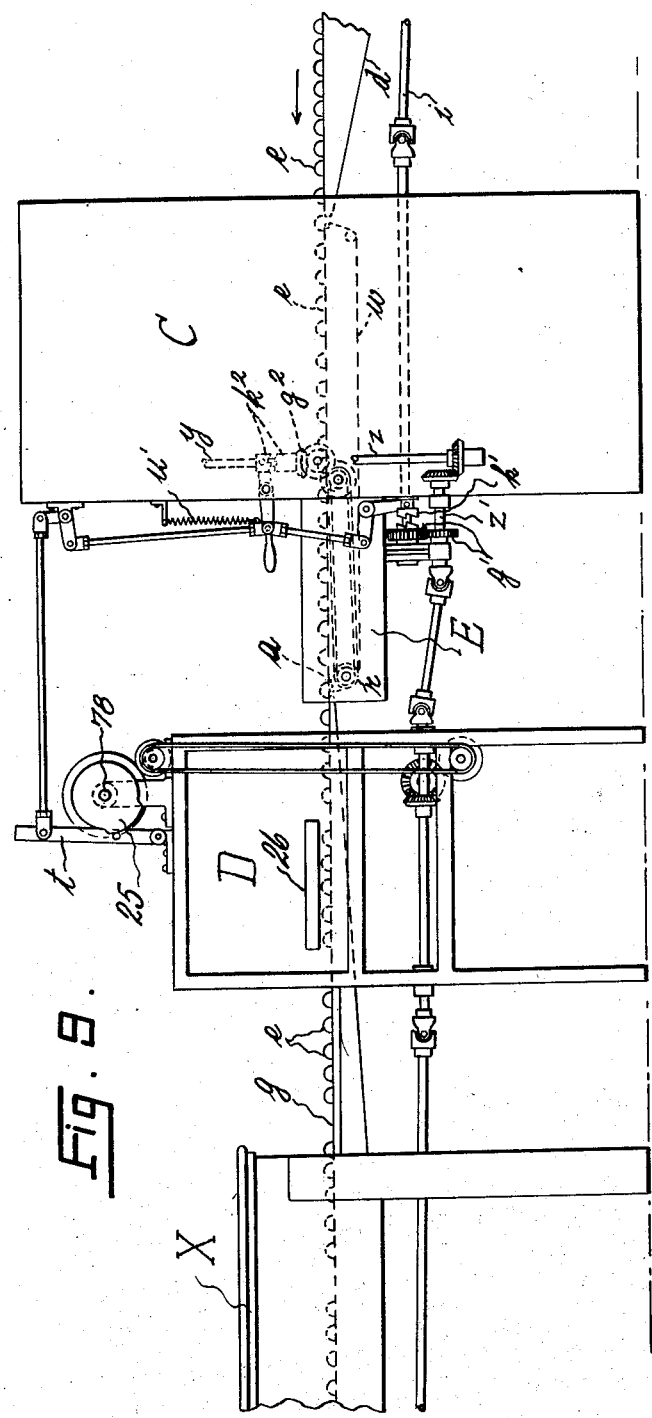

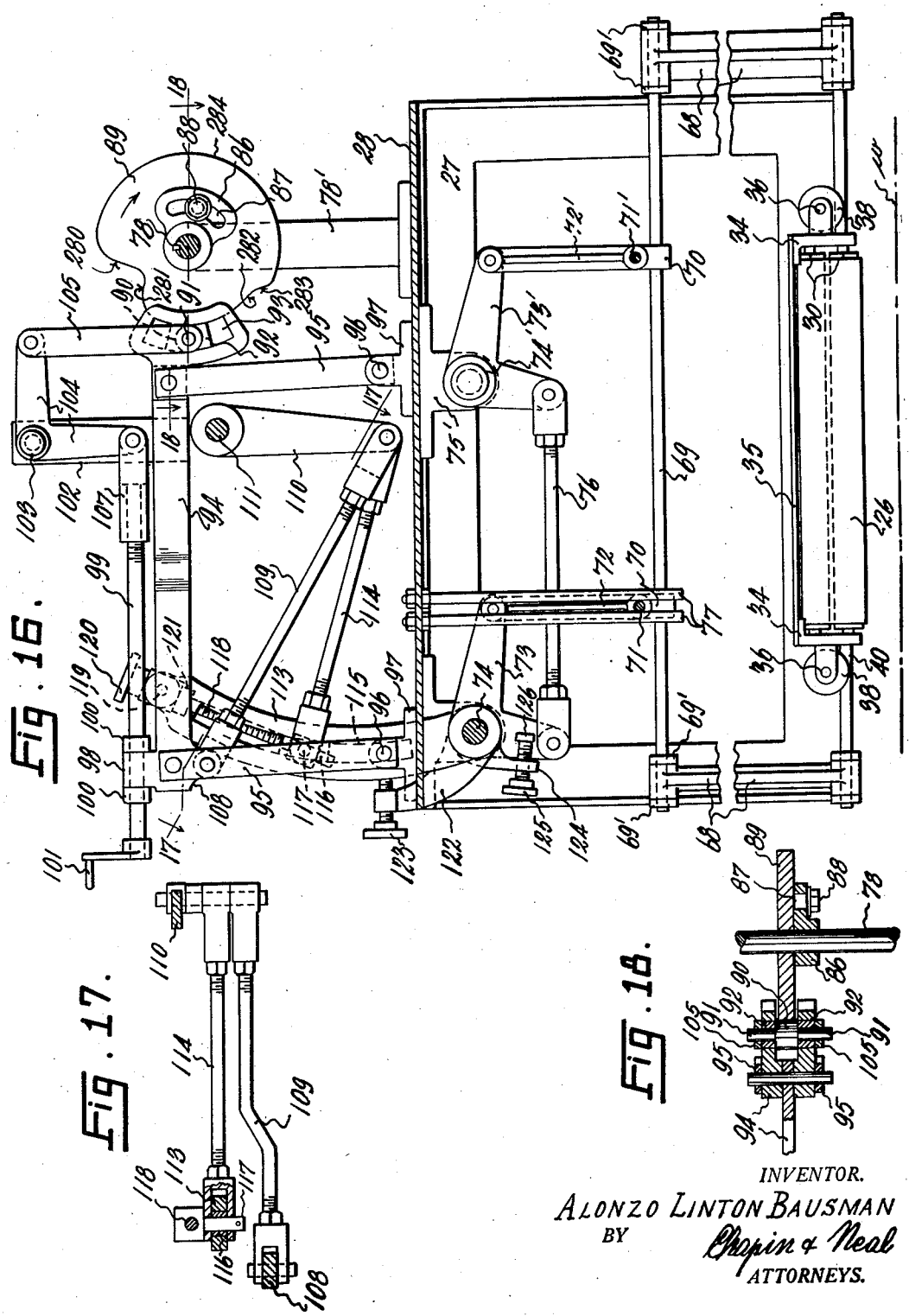

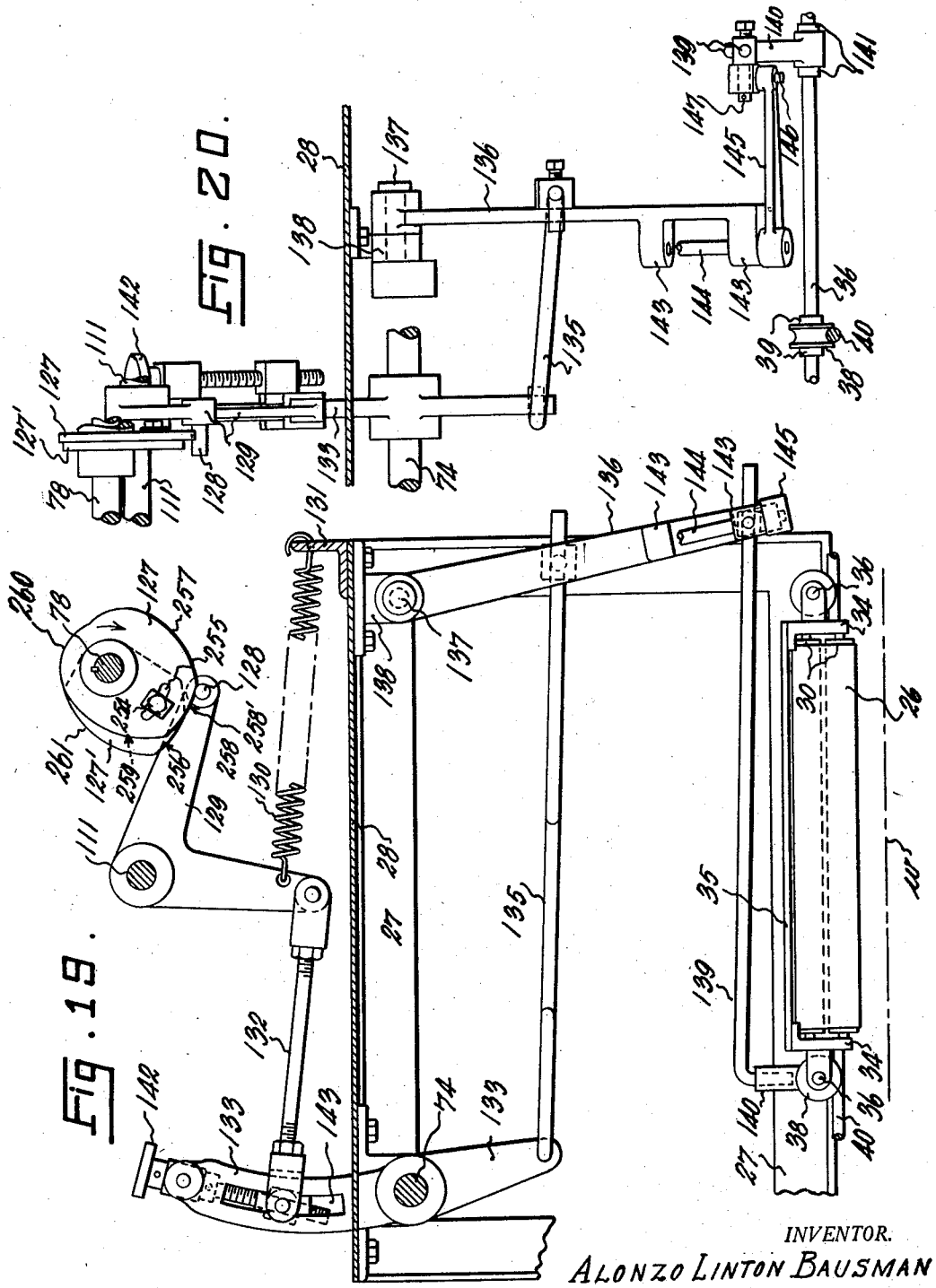

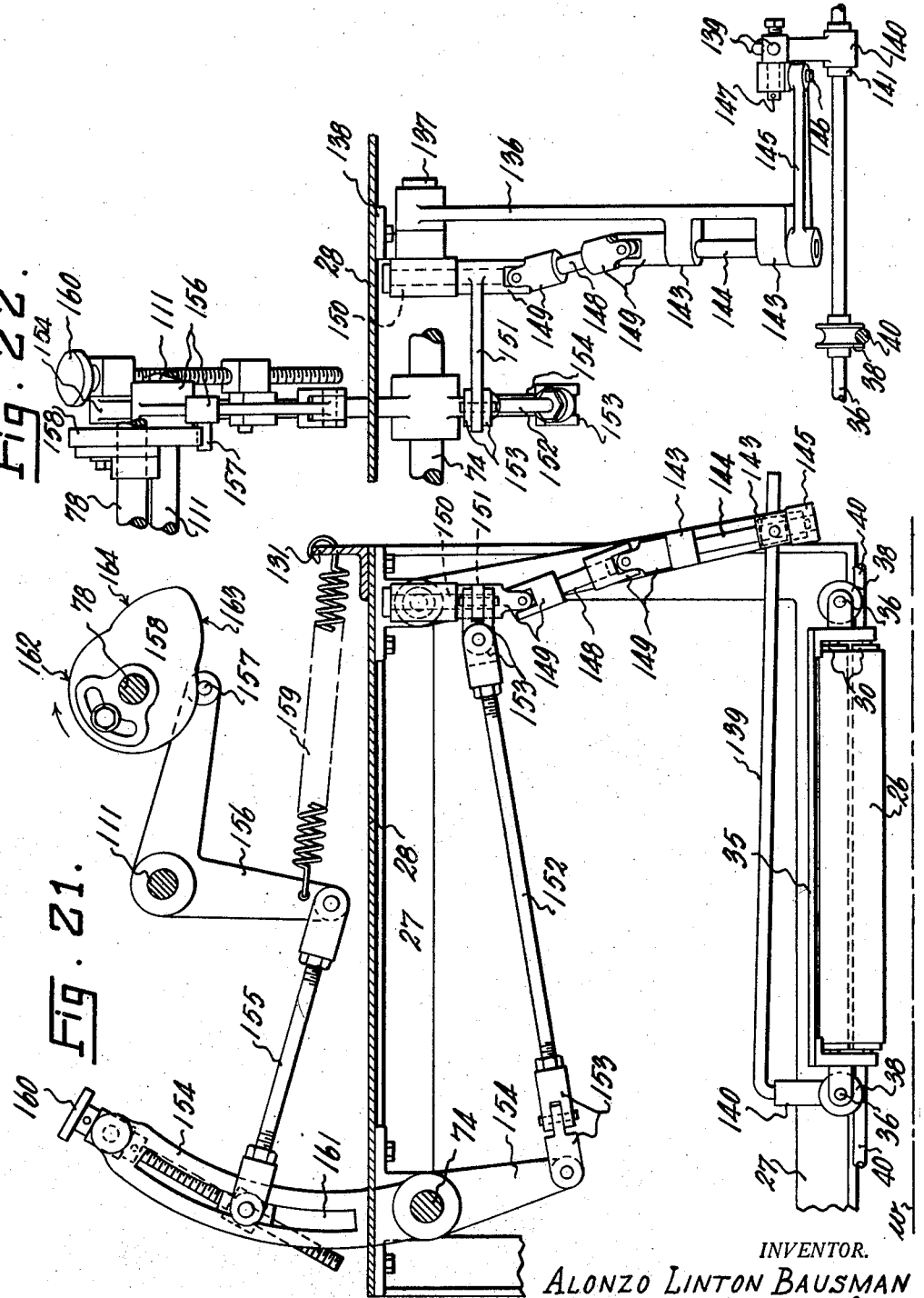

July 2, 1935.  A. L. BAUSMAN  2,006,432
APPARATUS FOR DECORATING CONFECTIONS
Filed July 10, 1933    13 Sheets-Sheet 12
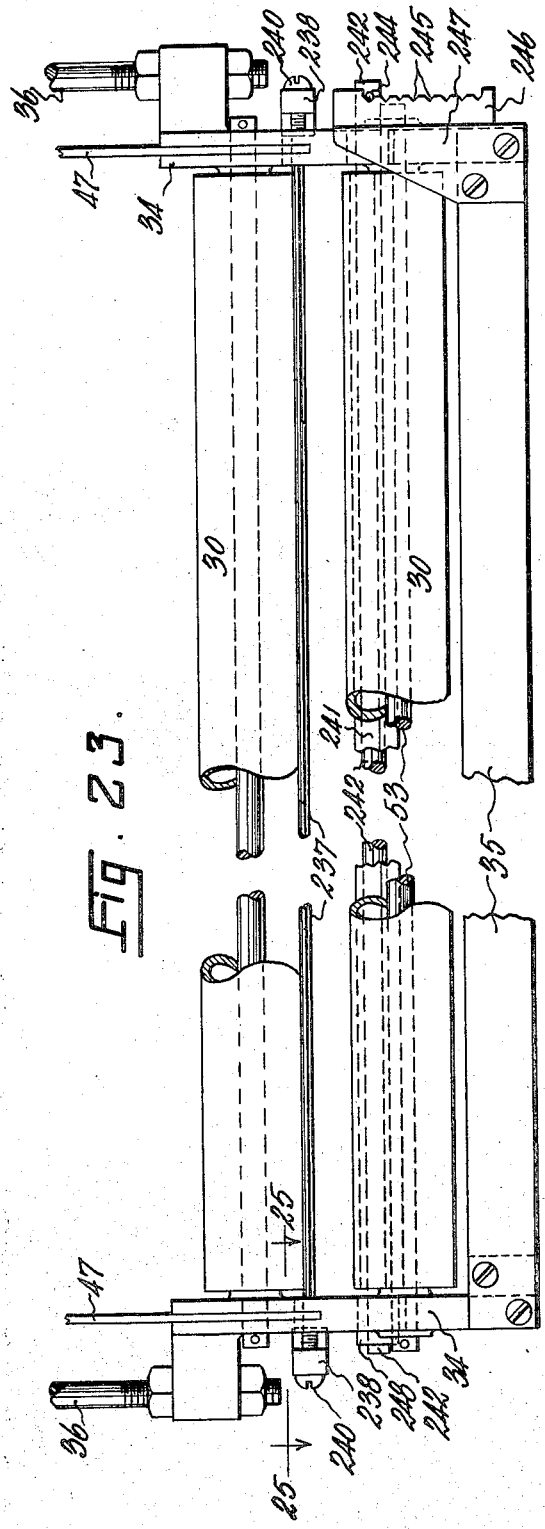
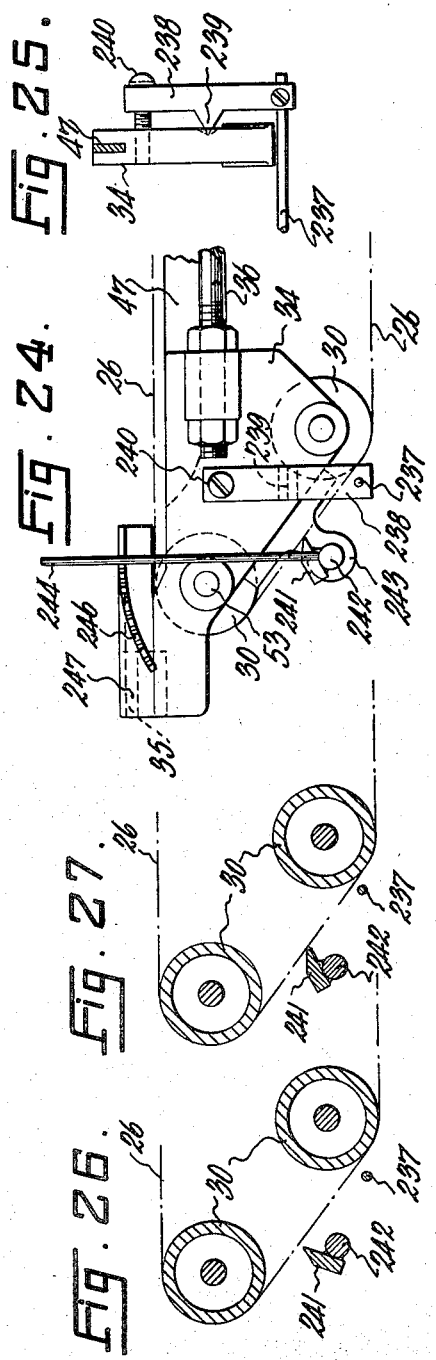
INVENTOR
ALONZO LINTON BAUSMAN
BY Chapin + Neal
ATTORNEYS July 2, 1935.   A. L. BAUSMAN   2,006,432
APPARATUS FOR DECORATING CONFECTIONS
Filed July 10, 1933    13 Sheets-Sheet 13

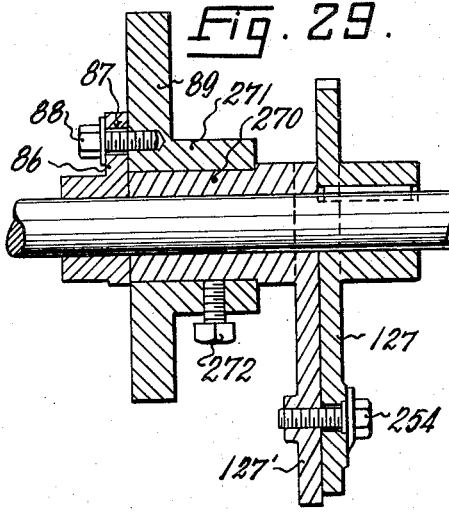

Fig. 29.

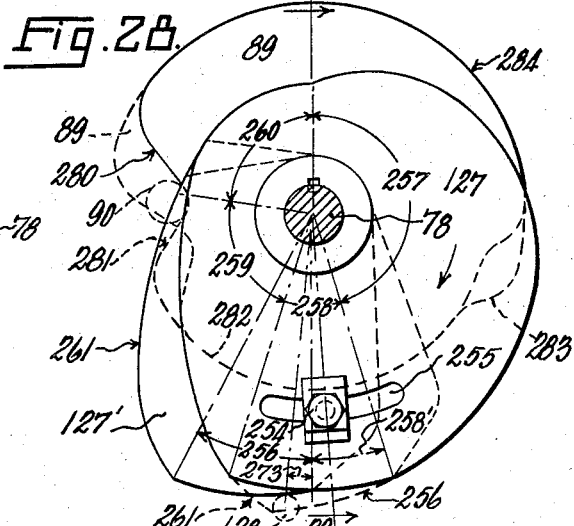

Fig. 28.

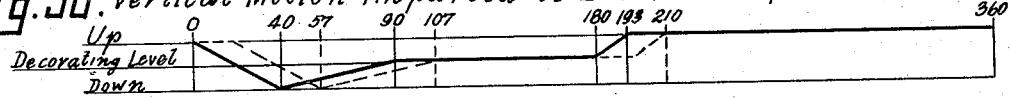

Fig. 30. Vertical Motion Imparted to Decorator by Cam 89

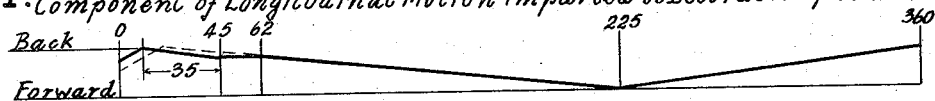

Fig. 31. Component of Longitudinal Motion Imparted to Decorator by Cam 127

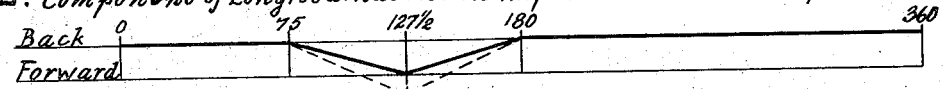

Fig. 32. Component of Longitudinal Motion Imparted to Decorator by Cam 158

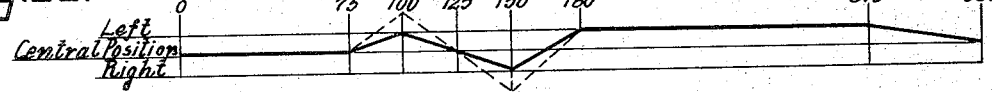

Fig. 33. Tranverse Motion Imparted to Decorator by Cam 165

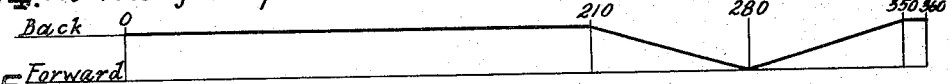

Fig. 34. Motion of Plaque Belt 26

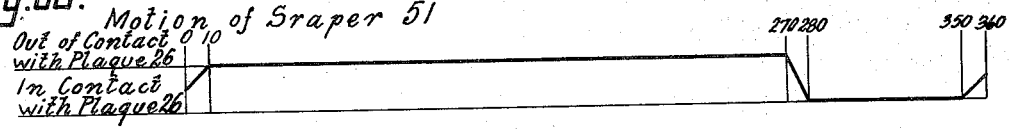

Fig. 35. Motion of Scraper 51

INVENTOR.
ALONZO LINTON BAUSMAN
BY Chapin & Neal
ATTORNEYS.

Patented July 2, 1935

2,006,432

UNITED STATES PATENT OFFICE 2,006,432

APPARATUS FOR DECORATING CONFECTIONS

Alonzo Linton Bausman, Springfield, Mass., assignor to National Equipment Company, Springfield, Mass., a corporation of Massachusetts Application July 10, 1933, Serial No. 679,703

20 Claims. (Cl. 91—3)

This invention relates to improvements in apparatus for decorating confections, such for example as confections which have been freshly coated with chocolate or any other confections, the outer surfaces of which are plastic and susceptible to being worked by the same treatment.

The invention is an improvement in that disclosed in my copending application for U. S. Letters Patent Serial No. 512,642, filed January 31, 1931 which has eventuated into Patent No. 1,956,306. In common with the earlier invention, the present invention makes use of a plaque which is mounted above the confection-carrying belt and presents a substantially flat lower surface of substantial area,—large enough to overlie at one time a group of confections on the belt. The decorations are effected by a working of the plastic coatings of the confections by this plaque. It is mounted to move toward and away from the belt as well as longitudinally and transversely thereof. The plaque periodically moves down into contact with a large group of confections, rises to draw from each a string of plastic coating and then, while the drawn-out strings remain attached to both the confections and the plaque, the plaque is moved in various paths in a substantially horizontal plane to shape the strings into such form that when they break away from the plaque they will fall back upon the confections in ornamental shapes.

The present invention has for one object to provide means for cleaning the plaque after each cycle of operation thereof, to remove any particles of chocolate remaining thereon so that the plaque when next used for decorating will present a fresh clean surface.

Alternatively, the means used for cleaning the plaque, such as a wiper or scraper, may by adjustment be arranged to allow a certain amount of chocolate to remain on the plaque. It is sometimes desired to decorate the confections with a "smeared" plaque, that is one having a coating of chocolate thereon, and the scraping means may then function in spreading the chocolate on the plaque into a layer of uniform thickness.

For each of the above purposes, relative movement between the plaque and scraper is necessary and, while either one of them may be moved to accomplish the desired purpose, I prefer to move the plaque itself and to this end it is another object to provide the plaque in the form of a flexible belt mounted on pulleys so that it may be periodically moved, like a belt on its pulleys, to carry the working surface thereof past the scraping means for cleaning purposes and subsequently back into position for use.

Another object of the invention is to provide means for preventing the chocolate, removed from the scraping means, from being carried back with the plaque as it moves back into working position.

Another object is to provide means for heating the plaque. Such a means is especially useful when the apparatus is operated with a "smeared" plaque, in that the layer of chocolate on the plaque is prevented from setting and is kept plastic and at the temperature best suited for decorating. It is also desirable when the plaque is used in the ordinary way, in that it prevents chocolate from solidifying on the plaque and makes it easier for the scrapers to clean the plaque.

Another object of the invention is to provide means, coordinated with the operation of the movable plaque decorator, to regulate the feeding of the confections thereto. For example, the belt which feeds the confections to the belt on which they are decorated, may be stopped at intervals to divide the confections into groups with a substantial space therebetween. This arrangement provides for feeding the confections in distinct groups in proper timed relation to the plaque decorator and, by so doing, avoids all possibility of the plaque decorator operating twice on any one confection.

Another object of the invention is to provide improved means for moving the plaque decorator in a direction longitudinally of the confection-carrying belt. At certain times the plaque travels in the same direction as the belt and during part of this travel it moves at the same speed and, during other parts, it moves faster or slower than the belt to accomplish certain effects in decorating the candies. Instead of a single means, as used heretofore for the purpose, two means are provided,—one for moving the plaque with uniform motion in the same direction and at the same speed as the belt and the other for accelerating or retarding the plaque relatively to the first means. This arrangement makes it much easier to design the cam for effecting longitudinal movement relatively to the confections.

Another object of the invention is to provide conveniently operable means for varying, while the apparatus is in operation, the extent of the various movements imparted to the movable plaque decorator to enable variations to be made in the decorations produced without changing the cams which produce such movements. For example, with such means, the same cams may be used to move the decorator so as to form circular, oval or other closed loop decorations and to form these shapes in various sizes.

Another object of the invention is to provide in connection with the means which moves the plaque decorator vertically, conveniently operable means for raising or lowering the decorator independently of said means to adjust its extreme lower position to conform with the height of the confections and enable it to be easily and quickly adjusted to work properly with confections of any given height.

It is also an object of the invention to provide means operable when the plaque is in its extreme lower position to vary the extent of lift that will be imparted to the plaque. Such adjustment in lift may be made after the plaque has been set to the desired height without causing a displacement of the plaque from such position.

Another object of the invention is to provide means conveniently operable while the apparatus is in operation, to vary the timing of the mechanism which raises and lowers the decorator relative to the other mechanisms which move it lengthwise or crosswise of the confection carrying belt. By such means, the time of contact of the plaque and confection can be varied relative to the other motions imparted to the plaque and variations in the decorative effects produced can be effected.

Various other objects will appear as the detailed description proceeds and will be pointed out in the appended claims.

The invention will be disclosed with reference to the accompanying drawings, in which:

Fig. 1 is a side elevational view partly in section, of the decorating apparatus shown as mounted on the delivery end of a confection coating machine;

Fig. 2 is an end elevational view taken from the right hand end of Fig. 1;

Fig. 3 is a plan view of the apparatus;

Fig. 4 is a sectional view taken on the line 4—4 of Fig. 3;

Fig. 5 is a fragmentary plan view of a certain linkage shown in Fig. 4;

Figs. 6 and 7 are plan and elevational views, respectively, of the movable plaque decorator;

Fig. 8 is a side elevational view showing the decorating apparatus mounted on the delivery end of a confection coating machine and operative to decorate coated confections while carried on the wire mesh belt of that machine, and showing also a means controlled by the decorating apparatus for feeding the confections to said machine;

Fig. 9 is an elevational view showing the decorating apparatus mounted to operate on the confections while carried by the delivery belt and after leaving the coating machine, and showing also another means for coordinating the feeding of the confections with the operation of the decorating apparatus;

Fig. 10 is a cross sectional view taken on the line 10—10 of Fig. 6;

Fig. 11 is a fragmentary top plan view of the decorator;

Fig. 12 is a fragmentary end elevational view of the decorator;

Fig. 13 is a fragmentary side elevational view illustrative of the operating means for the movable scraper;

Figs. 14 and 15 are front and side elevational views, respectively, of one of the cams for operating the decorator;

Fig. 16 is a sectional elevational view, taken on the line 16—16 of Fig. 3 and showing apart from the rest of the apparatus the mechanism for moving the decorator toward and away from the confection carrying belt;

Figs. 17 and 18 are sectional views taken on the lines 17—17 and 18—18, respectively, of Fig. 16;

Fig. 19 is a sectional elevational view taken on the line 19—19 of Fig. 3 showing apart from the rest of the apparatus one of the mechanisms for moving the decorator back and forth in a longitudinal direction with respect to said belt;

Fig. 20 is an elevational view of the right hand end of Fig. 19;

Fig. 21 is a sectional elevational view taken on the line 21—21 of Fig. 3 showing apart from the rest of the apparatus the other of the mechanisms for moving the decorator back and forth in a longitudinal direction with respect to said belt;

Fig. 22 is an elevational view of the right hand end of Fig. 21;

Fig. 23 is a fragmentary top plan view of the decorator showing a modification in the scraping means for the movable plaque;

Fig. 24 is an elevational view of the right hand side of the device shown in Fig. 23;

Fig. 25 is a cross sectional view taken on the line 25—25 of Fig. 23;

Figs. 26 and 27 are diagrammatical views showing the two positions of the scraping means;

Fig. 28 is an elevational view showing in combined form the cam for raising and lowering the decorator and the cam for moving it in a longitudinal direction with uniform motion;

Fig. 29 is a cross sectional view taken on the line 29—29 of Fig. 28; and

Figs. 30 to 35 are diagrammatical views showing the motions imparted by the various cams as more particularly stated in the title of each such figure.

Referring first to Fig. 8 of these drawings; C represents a machine for coating confections with chocolate and E the usual extension frame at the delivery end of such machine. Confections e are carried on a wire mesh conveyer w through said machine and coated with chocolate or any other desired kind of coating in the usual way. The conveyer w travels into the extension part E and, in passing from its upper to its lower stretch of travel, passes over a small roll a in order to make a sharp turn and then around a driving roll r. A delivery conveyer g is mounted to travel in the same direction and same plane as conveyer w and has one end in receiving relation with the delivery end thereof. The decorating apparatus, indicated as a whole at D, is mounted upon the extension E and operates as will later appear, on the confections e while carried by belt w.

The confections e may be fed to the machine C in the usual or any suitable way but preferably they are fed in groups,—each group comprising a plurality of confections usually arranged in several transverse rows as indicated,—and the last such row of one group is spaced from the first such row of a succeeding group by a space s which is somewhat larger than the space between successive transverse rows of one group. As shown, the confections are placed on a feed belt f which transfers them to the coating belt b of an apparatus H for coating the bottom surfaces of the confections. The belt b in turn transfers the confections to a conveyer d which carries them to and transfers them upon the conveyer $w$. The conveyers $f$, $b$ and $e$ in the upper stretches of travel, are in alignment with each other and with the upper stretch of belt $w$ and move in the same direction as belt $w$. The conveyers $b$ and $d$ are driven from machine C by the shafts $i$ and connections indicated, in the usual way. Conveyer $f$ is also driven from shafts $i$ but intermittently through the intermediary of relatively movable clutch elements $k$. When such elements are engaged, shafts $i$ drive a shaft $j$ which in turn drives through a worm $l$ and gear $m$ the drive roll $n$ of belt $f$. The movable clutch element $k$ is operated by a forked clutch lever $o$ which is connected by the links $p$ and bell cranks $q$ to a lever $t$, and the latter is operated as indicated by a cam 25 of the decorating apparatus. A spring $u$ tends to hold elements $k$ engaged but intermittently (once during each revolution of cam 25) these elements $k$ will be disengaged, whereby belt $f$ is stopped for a short interval while belts $b$, $d$ and $w$ continue in motion, thus creating the gap $s$ between the adjacent rows of adjacent groups of confections $e$.

The decorator D includes a plaque 26 which is of an area such that it can overlie at one time all the confections $e$ in one group. This plaque is so operated as to simultaneously contact with all the confections of such group, then rise to draw out strings of chocolate from the fresh coatings of the confections and then move in any desired path in a horizontal plane while the strings remain attached thereto in order to shape the strings in the desired way so that, when the strings finally break away from the plaque 26 they will fall back upon the confections and form ornamental decorations. This plaque 26 operates in timed relation with conveyer $w$ and completes one cycle of operation while the conveyer $w$ moves a distance equal to the width of the plaque, which width as shown in Fig. 8 is somewhat greater than the length of the group of confections $e$. By the time the plaque 26 has completed one cycle of operation, a second group of confections should be in position to be operated on by the plaque 26 but to insure against any possibility of the plaque operating twice on any row of confections, the latter are divided into groups as shown with a substantial space between each group.

The coating machine and feeding means therefor have been shown more or less conventionally because they are well known in the art. The coating machine may, for example, operate in the same general way as disclosed in Magniez Patent No. 735,890, dated August 11, 1903, and the feeding and bottom coating means may be constructed and operate as disclosed in the Bausman Patent No. 1,493,423, dated May 6, 1924. Reference to these patents may be had for a more complete disclosure, if desired.

The decorator may also be mounted in a separate frame as shown in Fig. 9, and arranged so that the plaque 26 operates on the confections $e$ while they are being carried by delivery belt $g$ and before they enter the cold box X. Where it is desired to feed the confections $e$ in groups, the wire belt $w$ and preferably also the feeding belt or belts driven by shafts $i$ are stopped intermittently by cam 25. With the delivery belt moving continuously, the same result of creating spaces between successive groups of candies $e$ will be effected. As shown, $y$ is the usual drive shaft for the belt $w$ and $z$ is the usual drive shaft for both the feed and delivery belts. Shaft $z$ drives through the bevel gearing shown, the shaft $z'$ which extends to the left hand end of the belt $g$ and drives it in the usual way, for example in the same way that belt $f$ is driven. Shaft $z'$ drives shaft $i$ through gearing $g'$ and a clutch $k'$. Shaft $y$ drives through a clutch $k2$ a bevel gear $g2$ which, through the connections indicated, drives the roll $r$ of belt $w$. The clutches $k'$ and $k2$ are simultaneously opened by cam 25 by means of the connections shown with lever $t$. A spring $u'$ tends to hold the clutches engaged. The illustration, although more or less conventional, will suffice to show those skilled in the art how the desired result can be effected.

Referring now to Figs. 1 to 4, the decorating apparatus is mounted in a frame comprising two side members 27, each of hollow rectangular form and mounted in upstanding relation one on each extension E. The upper ends of the members 27 are tied together by a plate 28 which serves to support most of the decorating apparatus and the operating mechanism therefor. The openings in the side frames 27 are usually closed by doors having windows therein, one of which is indicated at 29 in Fig. 8. The space shown in Fig. 2 between the side frames 27 and below the plate 28 is also closed in but the closure has been omitted from the drawings, as have also the doors 29, to enable the interior mechanism to be seen. Actually then, the decorating apparatus is completely enclosed except for the driving mechanism shown above plate 28 and this mechanism may, of course, be enclosed if desired. The space between the decorating apparatus D (Fig. 1) and coating machine C is preferably enclosed by a U-shaped hood 27'.

The decorating element,—the plaque 26 heretofore referred to,—is shown in operative position in Fig. 2 and the details of its mounting and of the parts associated therewith are best shown in Figs. 6, 7, 10, 11 and 12. The plaque is preferably of flexible material and may advantageously be of waxed paper or the like. It is preferably also mounted to move after each application to the coated confections, with relation to a cleaning device so that any chocolate remaining on the plaque after the decorating operation may be removed. As a convenient way of accomplishing this purpose, the plaque is trained over four rolls 30 and its ends are joined together by clamping them between two bars 31 and 32 (Figs. 7 and 10) by means of screws 33. The plaque supporting rolls are mounted in a frame including two pairs of end members 34, each pair of which supports one of the upper and one of the lower rolls 30. The members 34 of each pair are tied together by a cross bar 35 and each member of one pair is tied to the corresponding member of the other pair by a rod 36. Each rod 36 is fixed at one end, as indicated, to one member 34 and at the other end is screw threaded to receive nuts 37 by means of which it may be clamped to the other member 34 in various positions of adjustment. This adjustment enables the plaque belt 26 to be tensioned when necessary, and facilitates the operation of placing the belt on its rolls. These rods 36 each carry a pair of longitudinally spaced grooved rolls 38, each held in place between a pair of collars 39. These rolls or their equivalents, such as shoes or runners, are properly spaced to ride on a pair of rods 40 which provide tracks for the decorator to ride upon in a direction parallel to the direction of travel of the coating machine belt $w$ (see Figs. 1 and 4). The members 34, 35 and 36 constitute a carriage in which the plaque 26 is movably mounted and which is mounted to move along tracks 40 by means of rolls 38 or any other suitable means.

The plaque belt 26 may conveniently be moved on its rolls 30 by a pull imparted to the clamping device 31, 32, which holds the overlapping ends of the belt together. For this purpose an operating belt 41, shown in Fig. 2 and in part in Figs. 6 and 10, is provided. Belt 41 is clamped between the member 31 and a superposed plate 42 which is held to member 31 by screws 43. This plate 42 has upturned ends 44 which ride between a pair of guide strips 45, mounted parallel with the direction of travel of belt 26 and secured at their ends, one to each of the cross bars 35. These strips 45 as well as certain other details have been omitted from Fig. 2 to avoid undue confusion of lines,—reliance for the showing of details being placed on Figs. 6, 7, and 10 to 12. The ends of each cross bar 35 are slotted to receive the fastening screws 46. This provision enables the belt 26 to be tensioned as above described, when screws 46 are loosened. To prevent the belt 26 from sagging unduly in its upper stretch, the ends of member 32 are extended beyond the corresponding ends of member 31 (Figs. 6 and 10) to overlie and ride upon rails 47 which parallel the guides 45 and which each extend between and interconnect two opposed members 34 and are mounted at their ends in grooves formed in such members,—the rails 47 being slidable in at least one of such grooves to enable the members 34 to be moved toward or away from each other when required.

For cleaning the plaque 26, scraping means are provided and after each cycle of operation, the plaque is moved by belt 41 and operating mechanism to be described, far enough to carry its working surface (that portion of the lower stretch of the belt 26 which lies between rolls 30 and is operative to engage underlying confections) past the scraping means. The scraping means includes a stationary scraper blade 48 which extends across the outer ends of one pair of members 34 and is slidably supported at its ends by angle iron brackets 49, secured one to each such member. The blade 48 is mounted to move on its brackets 49 in a direction toward and away from belt 26, and may be moved thereon for adjustment purposes by the means indicated at 50. The scraper preferably acts on the plaque 26 at a location where the plaque is not backed up by any of the rolls 30 or any other unyielding part. It is desirable, in order to avoid excessive wear on the plaque, to have the plaque free to yield away from the scraper and this result is secured by locating the scraper 48 between one end set of upper and lower rolls 30.

A second scraper 51 is provided adjacent scraper 48. Scraper 51 extends between a pair of arms 52 and is secured at its ends, one to each of these arms. Such arms are fixed to a shaft 53 on which one upper end roll 30 is mounted to turn freely. One of the arms 52 is extended above shaft 53 (Fig. 13) for connection by a link 54 to the free end of an arm 55 which, at its other end is fixed to the lower end of a shaft 56 mounted in a bracket 57 secured to one of the cross bars 35. The upper end of this shaft is connected by a universal joint 58 to a shaft 59 (Fig. 12), having a drive pin 60 extending diametrically therethrough and projecting from opposite sides thereof. This shaft 59 and pin 60 are adapted for connection to the driving mechanism shown in Fig. 1 and later to be described.

The connections between arms 52 and 55 include three blocks 61 each having a trunnion 62. One of these is secured to each end of link 54 and the trunnion 62 of the block 61 which lies on arm 55 is pivotally received in the latter. The block 61 which is fixed to the other end of link 54 rests upon and has its trunnion pivotally received in a second block 61, the trunnion of which passes through arm 52. It will be clear that by turning shaft 59 the scraper 51 may be moved from the inactive position indicated by full lines in Fig. 7 to the active position indicated by dotted lines and back again.

Between the upper and lower stretches of the plaque belt 26 a sheet metal casing 63 (Figs. 6 and 7) is mounted, such casing being suitably supported as by brackets 64 from the rods 36. This casing contains an electric heating means 65 which may be used when it is desired to warm the plaque. Supply wire connections are indicated in Fig. 6 and these include a flexible cable 66 for enabling the decorator to move freely up and down, sidewise and longitudinally of belt w. One use for this heater is found in the case where confections are decorated by a "smeared" plaque,—that is, one having a coating of chocolate thereon. In such case, it is necessary to keep the chocolate coating on the plaque in plastic condition. When using the smeared plaque, the scrapers are backed off from the belt 26 to allow the formation of the chocolate coating on the plaque and they then act merely to control the thickness of the coating on the plaque by preventing the layer of coating from building up in thickness beyond a predetermined degree.

Referring to Figs. 1, 2 and 4, the track rods 40 on which the decorator unit just described is adapted to slide in a direction longitudinally of belt w, are each supported by a pair of links 68 arranged one near each end thereof. A rod 69 interconnects the upper ends of each pair of links 68. The links are free to turn on rod 69 but are held from axial displacement thereon by collars 69' fixed to the rod. Each rod 69 is mounted in the lower ends of a pair of blocks 70 fixed thereto. The front block of one pair is connected to the front block of the other pair by a rod 71 which is free to turn in such blocks about an axis at right angles to that in which rod 69 turns. A pair of links 72, through the lower ends of which rod 71 passes with freedom to turn therein, support this rod from a pair of bellcranks 73 mounted on a shaft 74, supported near its ends in bearings 75 fixed to and depending from plate 28. Each rear block 70 is connected by a pivot pin 71' to the lower end of a link 72', the upper end of which is pivotally connected to one arm of a bellcrank 73'. Each bellcrank 73' is supported on a separate stud 74' from a bracket 75', fixed to and depending from plate 28. The depending arm of each bellcrank 73' is connected to the depending arm of the correspondingly located bellcrank 73 by a link 76. It will be clear that when shaft 74 is rocked, the several bellcranks will turn in unison and the rods 69 and 40 and the decorator unit will be raised and lowered with respect to belt w. A pair of rods 77 fixed to and vertically depending from plate 28 (Figs. 1 and 16), engage shaft 71 on opposite sides and prevent longitudinal movement thereof. Shaft 71 is thus compelled to move in a true vertical path. The rails 40, however, are free to move transversely of belt w because the links 68 are free to turn on rod 69. If the decorator unit is moved transversely, by mechanism to be described, the grooved rolls 38 will push rails 40 and cause links 68 to swing on rod 69.

The various motions which are necessary to impart to the decorator, are effected from a cam shaft 78 driven by intermeshing spur gears 79 (Figs. 2, 3 and 4) from a shaft 80, which in turn is driven by a chain 71 and suitable sprockets (see also Fig. 1) from one of the shafts such as s' of the chocolate coating machine,— such shaft s' having a surface speed equal to the linear speed of belt w. The shafts 78 and 80 are mounted as indicated in suitable bearings 78' and 80', respectively, fixed to the upper face of plate 28. The gear 79 on cam shaft 78 is free to turn thereon but may be coupled thereto by engaging the clutch elements 82 and 83 (Figs. 2 and 3), the former being fixed to the gear and the latter slidably keyed to the shaft. Clutch element 82 is movable by a lever 84 pivoted to a bracket 84' and carrying a clutch fork 85 which engages in a circumferential groove in element 83 (see also Fig. 4).

The means for raising and lowering the decorator will next be described with special reference to Fig. 16. Fixed to cam shaft 78 is a member 86 having an arcuate slot 87 through which extends a cap screw 88, threaded into the cam 89 which is mounted on the cam shaft with freedom to turn thereon and in contiguous relation with member 86 (see also Fig. 18). The connection 87, 88 enables this cam to be angularly adjusted on shaft 78 for timing purposes in a convenient manner. Engaging cam 89 is a roll 90 (see also Fig. 18) having trunnions 91 received one in each of a pair of bearing blocks 92 which are slidable in a curved slot 93 (Fig. 16) formed in the forked end of a follower bar 94. This bar is supported for movement in a direction substantially radially of cam 89, by pairs of links 95 disposed one pair near each end of the bar. The lower ends of the links of each pair are fulcrumed on a shaft 96 mounted in bearings 97 fixed to the upper face of plate 28 (see also Fig. 3). Fixed to the outer end of bar 94 is an upstanding ear 98 affording a bearing for a shaft 99, which is held by collars 100 against axial movement in its bearing and which may be turned by a hand crank 101, fixed thereto. Fixed to and upstanding from bar 94 near its inner end is a bracket 102 which, by a stud 103, pivotally supports a bellcrank 104. The horizontal arm of bellcrank 104 is connected by a pair of links 105 one to each of the trunnions 91. The vertical arm of this bellcrank has pivotally connected thereto a fork 107 into the outer end of which rod 99 is threaded. By turning crank 101, shaft 99 may be screwed further into or out of fork 107 to move bellcrank 104, whereby the cam follower 90 may be shifted angularly relatively to its cam 89. This, like the adjustable connection between cam 89 and member 86, enables the timing to be varied but unlike the said connection, it enables the timing to be varied while the machine is in operation.

The follower arm 94 has a depending ear 108 which is pivotally received in one forked end of a link 109 (see also Fig. 17). The other end of this link is pivotally connected to a rocker arm 110 mounted to turn freely on a shaft 111 which, as shown in Figs. 2 and 3, is mounted in brackets 112 fixed to plate 28. Mounted on shaft 74 with freedom to turn thereon, is an upstanding rocker arm 113 which is operated from rocker arm 110 by a link 114. This arm 113 has a curved slot 115 in which a block 116 is slidable. The link 114 (Fig. 17) is forked to straddle arm 113 and is pivotally connected to the block 116 by a stud 117. A threaded rod 118 passes transversely through the head of stud 117. The other end of rod 118 passes through the head of a stud 119 mounted to turn in the upper end of arm 113. The rod 118 has fixed thereto a hand wheel 120, whereby it may conveniently be turned and this handwheel, together with a collar 121 fixed on the rod, cooperates with the head of stud 119 to hold the rod against axial movement. By turning wheel 120, the block 115 may be moved in arm 113 toward or away from shaft 74 to vary angular movement of the arm. When the roll 90 is positioned on the low point of cam 89, the curved slot 115 is concentric with the axis of the pivotal connection between link 114 and arm 110. The block 116 may then be shifted in slot 115 without causing movement of either of the arms 113 or 110. When the roll 90 is thus positioned, the plaque 26 is in lowered position and the adjustment described enables the throw of arm 113 and thus the degree of lifting movement of the plaque to be varied without varying the lowered position of the plaque.

Provision needs to be made to adjust the plaque 26 vertically with respect to belt w to take care of confections of various heights. The plaque, when lowered as far as possible by cam 89, must be moved up or down as required to secure the desired contact of the plaque with the confections. To this end, the rocker arm 113 is left free to turn on shaft 74 and moves the latter through an arm 122 fixed on the shaft. Arm 122 has an adjusting screw 123 therein which bears against arm 113. The weight of the movable decorator carriage and the parts which support it, holds screw 123 in contact with arm 113 when this arm swings in a clockwise direction. When arm 113 swings in the other direction, it pushes on screw 123 and moves arm 122 and turns shaft 74 to raise the decorator. By turning screw 123, the plaque may be raised or lowered relatively to the operating mechanism and adjusted to secure the desired contact with the confections.

It is important that the plaque be supported within close limits in parallel relation to belt w. Adjustments which will enable the plaque to be carefully levelled or brought into parallelism with belt w are very desirable. The plaque must contact simultaneously with all of the confections of one group and to insure this result, the aforesaid adjustments are necessary. For the purpose in view, only one of the two bellcranks 73 is keyed to shaft 74 (the right hand one as viewed in Fig. 2). The other, shown also in Fig. 16, is free to turn on this shaft and is moved by an arm 124 and a screw 125 which is adjustably mounted in the arm and engages a projection 126 on the bellcrank. As in the case of arm 122 and screw 123, the weight of the decorator and associated parts maintains contact between the screw 125 and projection 126. By turning screw 125, one corner of the decorator supporting frame comprising members 40, 68 and 69 can be raised or lowered with respect to the corner supported from the other bellcrank 73. To adjust the other two corners of the frame, the adjustable connecting rods 76 are lengthened or shortened as required to move their bellcranks 73' to the desired degree.

The means for moving the decorator longitudinally of the belt w will next be described. Such means includes two mechanisms,—one shown in Figs. 19 and 20 for effecting uniform motion of the decorator at the same speed and in the same direction as belt w; and the other shown in Figs. 21 and 22 for effecting longitudinal movement of the decorator relatively to the uniform motion, making it travel faster or slower than the belt at certain times.

Referring first to uniform motion mechanism, an operating cam 127 is fixed to shaft 78 in the location shown in Fig. 3. Referring to Figs. 19 and 20, this cam acts on a cam follower 128 carried by one arm of a bellcrank 129, mounted to turn freely on shaft 111. The follower is held against cam 127 by a spring 130 which connects the other and depending arm of the bellcrank to the unstanding leg of an angle iron 131, fixed to the top of plate 28. The depending arm of the bellcrank is connected by a link 132 to a rocker arm 133 mounted to turn freely on shaft 74 and held, along with two other similar rocker arms (Fig. 2), between a collar 134 fixed to shaft 74 and one of its bearings 75. The lower end of rocker arm 133 is connected by a bent link 135 to a lever 136 at a point intermediate the end of the latter. This lever is pivotally supported at its upper end on a stud 137 fixed in a bracket 138 secured to plate 28. The lower end of lever 136 is connected to one end of a link 139, the other end of which is downturned and received in a socket 140 (see Fig. 6). This socket, in which the cylindrical downturned end of link 139 is free to turn, is mounted to turn on one of the rods 36 of the decorator frame and is held against axial displacement thereon between a pair of collars 141. The decorator is shown in partly raised position in which the plaque 26 has drawn out strings from the confections on belt w, and at the start of its main movement of uniform motion in the direction of travel of belt w and at the same speed thereof. As cam 127 turns in the direction of the arrow the lever 136 will swing to the left and through link 139 push on rod 36, which forms part of the decorator frame, and cause the rolls to ride along the longitudinal tracks 40. The cam 127 is so designed as to move the plaque 26 on its forward stroke at uniform speed in the same direction and at the same speed as belt w. The return stroke of the plaque, which occurs between successive decorating operations and while the plaque is elevated, is not important and need not be at uniform speed. The extent of travel of the plaque is adjustable by varying the throw of rocker arm 133. This may be done by turning handwheel 142 which serves to raise or lower the pivotal connection of link 132 with arm 133. The means for effecting this adjustment are similar to those described for adjusting link 114 relative to arm 113 and include a curved slot 143 which, when the parts occupy the illustrated positions, is concentric with the axis of the pivotal connection between link 132 and bellcrank 129. Therefore, when the plaque 26 is positioned at the starting point of its main movement of uniform travel, the throw of arm 133 can be varied without displacing the plaque from its starting point.

The cam 127 is preferably made as shown in Figs. 14 and 15 with an adjustable segment 127' which is free to turn on shaft 78 and may be suitably fixed to cam 127 in various positions of angular adjustment, as by a cap screw 254 which passes through a curved slot 255 in cam 127 and threads into the segment 127'. The segment 127' has a peripheral portion 256 designed to produce uniform motion. The cam 127 has a much larger peripheral portion 257 also designed to produce uniform motion. Cam 127 also has a dwell portion 258, a portion 259 for effecting rearward movement of the plaque in any desired way, and a dwell portion 260. The segment 127' has a portion 261 shaped like the portion 259. As shown by full lines in Fig. 14, the preliminary part of the forward stroke of the plaque is initiated by the part 256 of segment 127' which moves it with uniform motion and at the same speed as belt w. There next ensues a dwell as the cam follower rides over the portion 258' of the dwell surface 258 of cam 127 and then, as the follower rides over the surface 257 of cam 127, the plaque is again moved with uniform motion and in the same direction and at the same speed as belt w. When the plaque reaches the end of its forward stroke, it dwells there while the follower rides on the part 260 of cam 127 and then moves backwardly as the follower rides over the surface 261 of segment 127'. By the adjustment 254, 255 the angular extent of the dwell interval 258' may be varied within suitable limits as desired and by moving it into the position shown by dotted lines in Fig. 14 this dwell interval may be entirely eliminated. The part 256 of segment 127' then forms a continuation of the part 257 of cam 127. The purpose of the uniform motion part 256 is to move the plaque with the belt at the same speed while it is being moved into contact with the confections and for a short interval during the initial stage of the lifting movement of the plaque, which movement immediately ensues. Contact is made and the drawing out of the strings initiated, while there is no relative motion between the plaque and the confections. Then the dwell 258' causes the plaque to stop moving forwardly and, since the confections continue to move forwardly, the strings drawn out from the confections will be pulled rearwardly thereof.

The movement of the plaque 26 by lever 136 would be uniform and equal in speed to the speed of belt w if the link 139 were directly pivoted to the lever. Actually, this link is mounted on this lever for relative movement and separate means are provided for moving the link relatively to the lever for the purpose of making the plaque move faster or slower than belt w at certain times. The means for effecting this movement of link 139 relatively to lever 133 are shown in Figs. 21 and 22 and will now be described. The lever 136 is provided with bearings 143 in which a shaft 144 is rotatably mounted with its axis paralleling the lever. The lower end of shaft 144 has fixed thereto an arm 145. Mounted to turn in the free end of this arm is a stud 146 the head of which pivotally receives a stud 147, disposed at right angles to stud 146 and having a head fixed to link 139. If this arm 145 is prevented from turning, the link will be moved by lever 136 in the manner above described. If, however, the shaft 144 is turned while lever 136 is moving the plaque 26, then the arm 145 will be swung and by so doing the link 139 will be advanced or retracted to accelerate or retard the movement of plaque 26 with respect to belt w. Shaft 144 is connected by a shaft 148 and universal couplings 149 or in any other suitable way to a shaft 150 mounted as shown in a part of bracket 138 to turn about a vertical axis. Shaft 150 carries an arm 151, herein shown as integral with the upper part of the upper coupling 149. Arm 151 is connected by a link 152 and suitable couplings 153 to the lower end of a rocker arm 154, mounted to turn on shaft 74 and located adjacent rocker arm 133 as shown in Fig. 2. Arm 154 is connected by a link 155 to one arm of a bellcrank 156 mounted to turn on shaft 111. The other arm of the bellcrank has a cam follower 157 riding on the periphery of a cam 158, suitably fixed, preferably by an adjustment similar to that described in connection with cam 99, to shaft 78. A spring 159 connects the angle iron 131 to the depending arm of the bellcrank and holds the follower against its cam. The throw of rocker arm 154 is adjustable in the same manner as described in connection with arm 133 and by similar means. These means include a handwheel 160 for effecting movement of the pivotal connection of link 155 to arm 154 in a curved slot 161 which, when the parts are positioned as shown, lies concentric with the axis of the pivotal connection of link 155 to bellcrank 156, and the throw of arm 154 may then be varied without causing movement of the plaque. Cam 158 has a dwell portion 162, a part 163 for moving the plaque ahead of belt w and a part 164 for moving the plaque backwardly with respect to belt w.

The means for moving the plaque 26 crosswise of belt w will next be described with special reference to Figs. 4 and 5. A cam 165, adjustably fixed to shaft 78 as indicated, operates a cam follower 166 carried on one arm of a bellcrank 167 mounted to turn on shaft 111. The other and depending arm of this bellcrank is connected by a spring 168 to angle iron 131 and by a link 169 to a rocker arm 170, mounted on shaft 74 alongside rocker arm 154 (see Fig. 2). The connection of link 169 to arm 170 is adjustable by a handwheel 171 to vary the throw of the arm in a manner similar to that described in connection with arm 113, and the curved slot 172 in arm 170 is concentric with the axis of the pivotal connection between link 169 and bellcrank 167, when the parts are positioned as shown with the plaque 26 in the center of its transverse path of movement. Thus, the throw of arm 170 may be adjusted to vary the extent of transverse travel of the plaque without displacing it from said position. The lower end of arm 170 is connected by a link 173 and suitable couplings 174 to one end of arm 175, fixed at its other end to a vertical shaft 176, mounted as shown in bearings 176' fixed to frame 27. The lower end of shaft 176 has fixed thereto an arm 177, the outer end of which pivotally receives a stud 178. This stud has a head 179 which pivotally receives a stud 180 disposed at right angles to stud 178. To the head of stud 180 is adjustably fixed one end of a rod 181 which at its other end is pivotally received on a stud 181' fixed in a block 182, mounted between a pair of collars 183 to turn on a vertical rod 184. This rod (see Fig. 1) is mounted to swivel in the central depending hub of a forked piece 185 which in turn is pivoted at its upper end on a stud 185', mounted in a bracket 186 secured to the under side of plate 28. Rod 184 has secured thereto at a point intermediate its ends, a member 187 (see Fig. 2) to which is hinged one end of a radius rod 188. The other end of the latter is hinged to a member 189 mounted to turn on a vertical stud 190 secured to a bracket 191 which supports the member 189 and is secured to one of the end members 35 of the frame of the movable plaque decorator. It will be clear that the cam 165 will swing rocker arm 170 and cause shaft 176 to be turned, thus swinging rod 184. The swinging movement of this rod is transmitted through radius rod 188 to the frame of the plaque decorator. The connections permit movement of the decorator back and forth in a longitudinal direction (the rod 184 can swivel in member 185 and member 189 can swivel on stud 190) and movement of the decorator up and down because of the hinge connections at the ends of the radius rod. When the decorator is moved transversely by rod 188, the flanges of the grooved rolls 38 prevent disengagement of the latter from tracks 49 and these tracks will be moved transversely of belt w, their supporting links 68 swinging about the axes of rods 69 and these rods turning in blocks 70 to permit the movement.

The cam 165 has a low dwell portion 262 for maintaining the plaque stationary in its center position while it is being lowered into contact with the confections and during the first part of the lifting movement of the plaque to effect the drawing out of strings from the coatings of the confections. The cam has a part 263 for moving it to the left (as viewed in Fig. 2) to one of its extreme positions, a part 264 for moving it from such extreme position to the right to the other extreme position, a part 265 for again moving it to the left into the first named extreme position, a high dwell part 266 for holding it stationary in such extreme left hand position while the plaque is being moved relatively to the scraper to clean it, and a part 267 for returning the praque to its centralized position. It is to be noted that since the cleaning of the plaque is effected while the plaque carriage is in its extreme left hand position, the chocolate removed from the plaque will not fall on belt w but will fall between one edge of said belt and the adjacent frame E.

The means for driving the plaque 26 will next be described with special reference to Figs. 1, 2 and 3. Fixed on the cam shaft 78 is an intermittent gear 192 cooperating with a pinion 193 fixed on one end of the rocker arm shaft 111. Gear 192 is arranged to impart one complete revolution of pinion 193 during one half of the revolution of shaft 78 and to maintain the pinion at rest during the other half revolution of shaft 78. Pinion 193 has fixed thereto a crank pin 194 which by a connecting rod 195 drives one arm of a bellcrank 196, mounted on a shaft 197 supported by bearings 198 from plate 28. The other arm of the bellcrank has formed thereon a segmental gear 199 which drives a pinion 200, fixed on a shaft 201, mounted in bearings 202, fixed to plate 28. Shaft 201 has fixed thereon a gear 203 which drives a pinion 204 fixed on shaft 205. The latter is supported in bearings 206 fixed to plate 28 and has fixed thereto a drum 207. The plaque driving belt 41, heretofore referred to as fixed to the clamping elements 31, 32 which hold together the ends of the plaque belt 26, is wound around drum 207 and is guided in its passage between the drum and decorator by a suitable series of pulleys so that as the drum is intermittently turned first in one and then in the other direction, the plaque 26 which is attached to the belt 41 will be moved first in one direction to cause the scraper to remove the chocolate from the plaque and then in the opposite direction to restore the cleaned plaque to its original position. The gearing which operates drum 205 is such as to move the plaque 26 a distance approximately equal to half its length and far enough to carry the lower stretch of the plaque which serves to decorate the candies, past the scraper. The intermittent gear 192 is timed so as to operate the belt 41 in the intervals between successive decorating operations. In Figs. 6 and 7 the plaque 26 is shown midway in its travel to more clearly show certain parts which would be hidden by the member 31 if the latter were positioned at the extreme right of Figs. 6 and 7 as it should be to agree with the illustrated positions of the parts of the plaque driving mechanism.

The belt 41 is supported and guided as best shown in Figs. 1 and 2. Starting at drum 207, a pulley 208 mounted on top of plate 28, guides one stretch of belt 41 into closely adjacent relation with the other and these two stretches pass downwardly in parallel relation first partly around upper pulleys 209 and then partly around lower pulleys 210,—these pulleys being mounted in the bracket 136 heretofore described. The belt extends from the lower pair of pulleys 210 in two parallel stretches, one on each side of the swinging rod 184 and in a vertical plane which passes through the pivotal axis 135' of rod 184, and these stretches of the belt extend to a pair of pulleys 211 carried by the bracket 187 on rod 184. Then the belt extends in two more or less horizontal stretches to and part way around a pair of pulleys 212 mounted in the upper and swivelling bracket 189, carried on one end of the decorator frame. From the pulleys 212 the belt extends vertically in two parallel stretches to a pair of pulleys 213 carried by the stationary bracket 191, which underlies and supports the bracket 189. From one of these pulleys 213 the belt extends in a lower horizontal stretch across the decorator frame to a pulley 214, mounted in a bracket 215, fixed to the opposite end thereof, and around this pulley and thence back in an upper stretch to the other one of the pulleys 213. The lower horizontal stretch of the belt, between the pulleys 213 and 214, is the one which is fastened to the plaque decorator 26 by the clamp 31, 42, as heretofore described.

The means for operating the movable scraper 51 will next be described with special reference to Figs. 1, 2 and 3. A cam 216 is fixed to shaft 78 and cooperating therewith is a follower 217 mounted on the upper end of a lever 218. The latter at its lower end is fixed to one end of a short horizontal shaft 219 mounted in bearings 220 fixed to the upper side of plate 28. A spring 221 which connects lever 128 to a bracket 222, fixed to plate 28, tends to hold the follower 217 engaged with the periphery of cam 216. The other end of shaft 219 is connected by bevel gears 223 to a short vertical shaft 224 (Fig. 1) mounted in a bearing 225, fixed to the lower side of plate 28. The lower end of shaft 224 is connected by a universal joint 226 to a long socket 227, fixed to the lower member of the universal joint. This socket has an axial bore to slidably fit the shaft 59, above described, and vertical slots 228 to receive the projecting pins 60 of such shaft. This bore and these slots extend to the lower end of socket 227 so that the shaft with its pins may be inserted in the bore and slots. The arrangement affords a detachable connection of the shaft 59 which is carried by the movable decorator carriage, and the driving means for such shaft which means are mounted on the frame of the machine. It also enables relative vertical movement between the parts 59 and 226 sufficient to allow the decorator to move in its various paths. It will be clear that the cam 216 will periodically cause the shaft 59 to be turned to swing the scraper 51 from the position shown by full lines in Fig. 7 to that shown by dotted lines, and back again. The cam 216 has a dwell portion of relatively large angular extent for maintaining the scraper 51 in the retracted position shown in Fig. 7 and another but less extensive dwell portion for holding the scraper in the position shown by dotted lines. The cam 216 is so timed as to move the scraper into the dotted line position of Fig. 7 when the plaque has neared the end of its shifting movement to the right as viewed in Fig. 7, for the purpose of cleaning that portion thereof which is used in decorating the candies. As the plaque is shifted to the left to restore the portion thereof which was cleaned by scraper 48, into position for use in again decorating candies, the scraper 51 prevents the mass of chocolate removed by scraper 48 from returning with the plaque. Scraper 51 need not contact with the plaque to accomplish this purpose, although it may do so if desired to prevent any chocolate from clinging to the plaque as it moves back into working position. Then the scraper 51 is moved back into its full line position to remain there until another cycle of operation of the plaque in decorating the candies has been effected.

The cam 25 and the lever $t$ operated thereby, as heretofore described, for the purpose of intermittently stopping the feed belt of the coating machine and causing the confections to be fed to the decorator in longitudinally spaced groups $e$, are preferably constructed as shown in Figs. 1 and 3 to enable variations in timing to be conveniently effected and to enable variations in the spacing between successive groups of candies $e$ to be effected. For the latter purpose, the effective extent of the dwell surface 229 is adjustable to control the interval in which the feed belt $f$ is stopped. As shown, the cam 25 is associated with an identically shaped cam 25'. These two parts are mounted face to face in contiguous relation, one part, as 25', being fixed to shaft 78 and the other, as 25, being free to turn thereon. The two parts are secured together by a bolt 230 passing through a slot 231 in cam 25. The two parts 25 and 25' are thus angularly adjustable and may be moved from a position in which their contours coincide, to various other positions such as that illustrated in Fig. 1, wherein the dwell surfaces 229 and 229' do not coincide and a portion of one thereof serves as an extension of the other. The cam follower 232 engages both parts 25 and 25', wherefore by the arrangement above described, its time of dwell in its outermost radial position may be lengthened or shortened within limits as desired, and thus the feed belt $f$ may be stopped for longer or shorter intervals to vary the spacing between successive groups of candies.

To vary the time at which the feed belt stops relative to the operation of the decorator, the cam follower 232 is mounted to move in a curved slot 233 in the lever $t$ which supports it. The follower is adjustable by turning the hand wheel 234 by means similar to those heretofore described, as for example, the means shown in Fig. 16 for raising and lowering the stud 117. In the present case the member corresponding to stud 117 carries the cam follower. The lever $t$ is pivoted at its lower end on a stud 235 mounted in a bracket 236, secured to the upper face of plate 28. When the lever $t$ occupies its normal position, which is the illustrated one and the one in which the clutch $k$ controlling feed belt $f$ is engaged, the slot 233 lies concentric with shaft 78 and the cam follower 232 can then be adjusted angularly of its cam 25, 25' by turning wheel 234 without causing movement of lever $t$ and the parts $o$, $p$ and $q$ which are moved thereby as already described. This adjustment enables the operator to time the feeding of the groups of confections with the operation of the plaque decorator so that when the plaque descends it will contact with all the confections in one group.

A modification is shown in Figs. 23 to 27 inclusive, in which the movable scraper 51 and all of its operating connections are eliminated. A wire 237 is stretched across between one pair of end frames 34 of the movable decorator and lies in close proximity to the plaque 26. This wire is fixed at its ends in the lower ends of a pair of arms 238 mounted one adjacent each end frame 34 and each engaged with its end frame by a knife edge 239 at a point intermediate its ends. A screw 240, passing through the upper end of each arm 238, is threaded into the adjacent frame 34, whereby when these screws are tightened, the lower ends of arms 238 may be spread apart to tighten wire 236. This wire does not touch the plaque so that chocolate thereon is not wiped off by the wire as the plaque is moved relatively to the scraper for cleaning purposes but the mass of chocolate which piles up on the scraper is prevented from travelling back with the plaque and caused to fall. The chocolate thus removed will fall into the extension portion of the coating machine at a point between one edge of the wire belt $w$ and the adjacent side frame E as above explained in connection with the description of the scraper 51.

It is sometimes desired to decorate confections with a "smeared" plaque, i. e., one having a coating of chocolate thereon. In such case, the scraper is moved away from the plaque to an extent equal to the desired thickness of the layer of chocolate on the plaque. The scraper then removes excess chocolate from the plaque and helps in spreading the chocolate into a layer of uniform thickness. The scraper 48 may be adjusted by the means already described for this purpose. However, a more easily adjustable scraper better adapted for this purpose is shown in Figs. 23 and 24. Here the scraper 241 is secured in any suitable way, as by welding, to a shaft 242, the ends of which are mounted in bearings 243, secured one to each of two opposite end frames 34. A handle 244 is fixed in upstanding relation to one end of shaft 242 and its upper end may be engaged in any one of a series of notches 245 formed in a segment 246, which is fixed to an angle iron 247 secured as indicated in Fig. 23 to bar 35. A collar 248 is fixed to shaft 242 and abuts one of the bearings 243 to hold the handle 244 seated in one of the notches 245. The handle has sufficient spring in it to enable it to yield outwardly when pushed from one notch 245 to another. The normal position of the scraper is shown in Figs. 24 and 27 and in this position the scraper engages plaque 26. By swinging the handle 244 to the left as viewed in Fig. 24, the scraper may be moved away from the plaque to various degrees, as for example into the position shown in Fig. 26 in which the scraper simply controls the thickness of the layer of chocolate formed on plaque 26.

When the decorating plaque 26 rises, after contacting with the plastic coatings of the group of confections, there is a tendency to lift the confections from the wire mesh belt $w$. This tendency is resisted by the adhesion of the plastic bottom coatings of the confections to the wires of which the reticulated belt $w$ is composed. But the total area of these wires engaged by any one confection is much less than the bottom area of that confection. To still further resist the aforesaid tendency and insure that the confections will not be lifted when the plaque 26 rises, an impervious belt 249 (Fig. 1) is mounted between the upper and lower horizontal stretches of belt $w$ near the delivery end thereof at a location such as to underlie each group of confections $e$ at the time when the plaque is rising from that group to draw out strings from the coatings thereof. Belt 249 is trained ofer rolls 250 and 251. Roll 250 is driven by a chain 252 and suitable sprockets from the drive roll $r$ of belt $w$. Belt 249 is driven at the same speed as belt $w$ and its upper stretch moves beneath the upper stretch of belt $w$ in the same direction and in closely adjacent and parallel relation. Belt 249, unlike belt $w$, presents a large unbroken area to which the chocolate on the bottoms of the confections may cling and prevents air from reaching the bottoms of the confections. Consequently, any tendency to lift the confections would be resisted by the suction effect incident to raising them from the belt 249 to which the bottom coatings cling. Thus, this belt functions to prevent the lifting of the candies by plaque 26.

A very desirable modification is shown in Figs. 28 and 29, in which the cam 89 which effects the raising and lowering of the decorator carriage, is combined with the adjustable cam 127, 127' which effects longitudinal movement of such carriage with uniform motion and in the same direction and at the same speed as belt $w$. These cams are constructed in the same manner as heretofore described, except that the adjustable section 127' of cam 127 is provided with a hub 270 which is mounted to turn freely on shaft 78 and is telescoped into the hub 271 of cam 89. These two telescoped hubs may be secured together to turn in unison in any suitable way but preferably this connection is made in a manner to permit adjustment, as by the set screw 272. The cam 89, as before, is connected to shaft 78 by a cap screw 88 riding in a curved slot 87 of a member 86, fixed to shaft 78. When the cam 89 is angularly adjusted on its shaft, such adjustment will compel an adjustment of the section 127' of cam 127 or vice versa. If the cap screws 88 and 254 are first loosened, then when one moves the cam 127' through a given angle, he will likewise move cam 89 through the same angle or if he moves cam 89 to change its setting on shaft 78, he will at the same time effect a corresponding change in the setting of cam 127'. The importance of thus coupling these two cams together lies in the fact that one can vary the dwell interval 258' and still secure contact of the decorator with the confections at the same angular interval ahead of the start of the dwell interval. For example, as above described, it has been found preferable to have the plaque decorator 26 make contact with the confections while moving at the same speed and in the same direction as the confections so that there is no relative movement between the plaque and confections except the relative vertical motion necessary to establish contact. Also, it has been found desirable to lift the plaque away from the confections to start the drawing out of the strings, while the same conditions exist. So as indicated in Fig. 28, the cam follower 128 is so adjusted relative to the cam follower 90 that, when the latter rides into the lowest portion of its cam 89, the follower 128 will not have reached the end of the uniform motion part 256 of its cam 127' by an angular distance such as that indicated at 273. Thus, while the follower 128 rides over the part 256 through the portion 273 thereof, the follower 90 will be moved by its cam 89 far enough to initiate the lifting of plaque 26 away from the confections. Having once found by experiment the best relative setting of the cam followers 89 and 128 with relation to their respective cams, or in other words the best value for the angle 273, it is important to preserve this setting irrespective of the variations in the dwell interval 258' which may be made by adjustment. The described arrangement effects this result because, whenever the cam 127' is shifted to vary the dwell interval 258', the cam 89 will be shifted through an equal interval, whereby when the follower 90 moves into the lowest position on cam 89, the follower 128 will be found spaced ahead of the start of the dwell interval by the angle 273.

The operation of the apparatus will next be described. As will be clear from the foregoing description, the decorating element 26,—a flexible plaque-like member,—is mounted in overlying relation with the conveyer w of the chocolate coating machine C, or the delivery conveyer g thereof, the only requirement being that the coatings or outer surfaces of the confections e at the time when they are operated on by the decorating member, be plastic and workable. The decorating member extends transversely across the conveyer w or g and is long enough to simultaneously overlie all the confections in one transverse row on the conveyer, and wide enough to simultaneously overlie several such rows. Actually, of course, the confections need not be accurately alined in longitudinal and transverse rows and that is one advantage of this type of decorator. The important point is that the decorator element overlies at one time a group comprising a large number of confections spaced apart one from the other, both transversely and longitudinally of the conveyer. The confections may be fed to the decorator in any suitable or desired way. Preferably, they are fed by means such as are disclosed in Fig. 8 or 9, so that the confections are segregated into distinct groups with a greater longitudinal spacing between successive groups than the normal longitudinal spacing between successive confections in the group. This result is effected by stopping the feeding belt (belt f of Fig. 8 or w of Fig. 9) once during each cycle of operation of the decorator for an interval long enough to create a space of the desired longitudinal extent, such as s. The operation of the feeding belt is controlled by cam 25 which, as disclosed, is adjustable to allow variations in the length of the space created between successive groups. This cam is adjustably mounted on its shaft 78 to enable it to be set wherever necessary to cause the feeding belt to stop for a short interval after the desired number of confections for one group have arrived in under the decorating element 26.

The decorator element is mounted, preferably like a belt on rolls, in a carriage which as disclosed can be moved up and down with respect to belt w, back and forth in a direction transversely of this belt, and back and forth in a direction longitudinally of this belt. While the decorator carriage is in motion, the plaque 26 may be moved on its rolls and caused to traverse the scraper 48, the scraper 241 of Figs. 23 to 27, or any other means for suitably cleaning the plaque. So also, the movable scraper 51, when used, may also be operated while the decorator carriage is in motion. These various motions are effected by the various cams described, or equivalent means, mounted on or driven from shaft 78 in properly timed relation to effect their various functions.

The relationship between these various motions is best shown in the series of charts shown in Figs. 30 to 35 inclusive, each of which has been given a suitable descriptive title. In each chart, the abscissas represent degrees of angular movement of the cam shaft 78 and the length of each chart represents one revolution of such shaft. The ordinates of each chart represent position and are plainly marked on each chart so that their meaning will readily be understood. The graph of each chart, in those portions which are inclined to the horizontal, represents motion; and in those portions which are horizontal, dwell. The several charts are shown in proper relationship one with another. Thus, when shaft 78 is in "zero" position, the position of the decorator carriage vertically will be found by reference to the zero point in the chart of Fig. 30, its longitudinal position will be found by reference to the zero point of the chart in Fig. 31, its transverse position with reference to the zero point of the chart of Fig. 33, and so forth. With this explanation, it is thought that the charts will be readily understood.

Starting at the zero point, the plaque 26 is stationary with respect to its supporting carriage as shown in Fig. 34, and remains so during the entire operation of decorating the confections and up to the position marked 210 degrees. The scraper 51 as shown in Fig. 35, is moving toward its retracted position and has already moved clear of the plaque and will remain thus positioned during the entire decorating operation and up to the position marked 280 degrees. The decorator carriage is raised to its highest level as shown in Fig. 30, and is stationary so far as motion transversely of belt w is concerned, in its central position as shown in Fig. 33. As shown in Fig. 31, the decorator is moving back in a direction opposite to that of the travel of belt w, and has nearly reached the end of its return stroke. The first step is to lower the decorator carriage until the plaque contacts with the confections on belt w. As shown by full lines in Fig. 30, this step is effected during the first 40 degrees of movement of shaft 78 by the portion 280 of cam 89 but, by reason of the adjustable mounting of cam follower 90 which may be angularly shifted relatively to its cam 89, as shown in Fig. 16 or by reason of the adjustable mounting of cam 89 shown in Figs. 28 and 29, this step can be made to occur later. For example, contact of the plaque with the confections may be made to occur at any point between the positions marked 40 and 57 degrees, the dotted lines in Fig. 30 indicating the last named extreme position. Shortly after the decorator carriage starts to descend and before contact of the plaque with the confections has been made, the decorator carriage starts to move forwardly as indicated in Fig. 31, in the same direction and at the same speed as belt w by virtue of the cam follower 128 riding on the portion 256 of cam 127'. Such motion of the carriage may be made to occur later, as indicated by dotted lines in Fig. 31, by means of the adjustment shown in Figs. 28 and 29. The plaque 26 will be moved into contact with the confections in a true vertical path and without any relative movement in a horizontal plane relatively to the confections. This is so because the cam followers 157 and 166 are then riding on the dwell surfaces 162 and 262 of their respective cams 158 and 165 and the carriage is, as has been said, traveling with the wire belt at the same speed because the cam follower 128 is riding on the uniform motion section 256 of cam 127'. Immediately that contact between the plaque and confections has been made, the portion 281 of cam 89 causes the decorator carriage to rise and some of the chocolate coating of each confection will adhere to the plaque and be drawn up into a string, usually from the center of the confection. After the plaque has risen to a certain extent (far enough to start the formation of the chocolate strings), the longitudinal movement of the decorator carriage is momentarily halted by the cam follower 128 riding onto a dwell surface 258' of cam 127. This dwell is represented by the short horizontal line in Fig. 31. The result is that the confections continue to be moved forwardly by belt $w$ while the plaque is momentarily held against longitudinal movement. Meanwhile the plaque continues to rise and the strings continue to be drawn out from the confections and are pulled in a direction upwardly and rearwardly thereof. The chocolate, drawn out from the coating, is thus worked back to the trailing edge of the confections. After this work has been accomplished to the desired extent depending on the extent of the dwell 258', the plaque again moves forwardly in the same direction and at the same speed as belt $w$ because of the follower 128 riding onto the second uniform motion section 257 of cam 127. The plaque continues to rise until the follower 90 rides onto the dwell surface 282 of cam 89 where it is held at the decorating level during the remainder of the operation of forming the decorations.

At about this time the cams 158 and 159 come into action and move the plaque in a horizontal plane relatively to the confections in directions longitudinally and transversely of belt $w$ to form the strings into the desired form. These last two cams may, of course, have various contours, according to the shape of decoration which it is desired to form. Those shown are designed to form circular decorations or modifications thereof, such as elliptical figures or others of generally looped formation. Starting from the position marked 75 degrees, the surface 263 of cam 165 acts on follower 166 to shift the decorator carriage transversely of belt $w$ from its central position to one of its extreme positions. Simultaneously the surface 163 of cam 158 acts on its follower 157 to move the carriage forward longitudinally at a speed faster than that of the wire belt. The longitudinal movement relative to the confections is shown in Fig. 32 and the transverse movement in Fig. 33. The composite effect of these two movements is approximately an arc of about 90 degrees' extent and the strings of chocolate are swung from the central rear portions of the confections to the left and forwardly thereof. Then, while the carriage continues to move forwardly at a speed in excess of that of belt $w$, the surface 264 of cam 165 causes the carriage to move transversely in a reverse direction to that described (from the position marked 100 in Fig. 33 to that marked 125) to carry the plaque from said extreme position back to the center position. The composite effect of these two motions is a second arc of 90 degrees' extent and the strings are swung to the right and forwardly. Then, while the plaque is moving transversely of belt $w$ in the last named direction from the central position to its other extreme position (from the position marked 125 to that marked 150 in Fig. 33), the surface 164 of cam 158 causes the longitudinal movement of the plaque to be effected at a less speed than that of the wire belt, as indicated by the upwardly slanting line in Fig. 32 from the position marked 127½ to that marked 180, whereby the strings are turned back and to the right and a third arc of 90 degrees formed. Finally, the cam follower 166 rides onto the portion 264 of cam 165 and causes the plaque to be shifted from its last named extreme position transversely of belt $w$ back to its center position, as indicated in Fig. 33, and this is done while the plaque is moving in a longitudinal direction more slowly than belt $w$, whereby the fourth ninety degree arc is formed. Thus, the string is worked into the form of a circle. By changing the throw of the levers 154 and/or 170, the string may be made elliptical with its major axis disposed either in the direction of travel of belt $w$ or transversely thereof.

Having shaped the strings into the form desired, the plaque 26 is then raised to its extreme upper level as indicated in Fig. 30 by the upwardly sloping line which starts from the position marked 180 and ends at the position marked 193. As indicated by dotted lines, this motion may occur somewhat later when the contact of the plaque with the confections is made to occur later. This motion results from the cam follower 90 riding up the portion 283 of cam 89 onto the dwell surface 284. The result of this lifting of the plaque is to break the strings and allow them to fall back on the confections.

The next operation is to clean the plaque and this, as will be clear from a comparison of Figs. 34 and 32 occurs largely during the return travel of the plaque along its upper level. It also occurs while the plaque carriage is held stationary in its left hand extreme position (see Figs. 2 and 33), wherefore the chocolate removed from the plaque will drop through the space between one side edge of belt $w$ and the adjacent extension E. The intermittent gear 192 commences to revolve pinion 193 at the position marked 210 in Fig. 34 and the crank pin 194, through link 195 will swing lever 196 first in one direction (from position 210 to position 280 in Fig. 34), and then in the other (from position 280 to position 350 in Fig. 34). This results first in the rotation of drum 207 and the movement of belt 41 in the proper direction to move plaque 26 to the right as shown in Fig. 7, and to an extent sufficient to carry its working surface (say the portion of its lower stretch which lies between the two lower rolls 30) past the scraper 48 and then in a reverse direction to restore the plaque to its original position. Just before the plaque 26 completes its movement to the right as viewed in Fig. 7, the scraper 51 moves from the position shown by full lines to that shown by dotted lines in Fig. 7,— such movement being indicated in Fig. 35 as occurring between the positions 270 and 280. Then this scraper 51 is held stationary in its dotted line position while the plaque is moved back to its original position, as will be clear from a comparison of Figs. 34 and 35. Finally, the scraper 51 moves away from plaque 26 and returns to its full line and inactive position, such movement starting at the position marked 350 in Fig. 35 and ending at the position marked 10.

It should be noted that it is not necessarily essential for all purposes that the plaque 26 move back and forth past scraper 48 in the same cycle of operation, although that is the form shown herein. The plaque might move in one direction past the scraper and then dwell in such position, while another portion is used for decorating. Then on a succeeding cycle of operation the plaque could be moved back and the last named portion cleaned by a second scraper such as 48 located at the opposite end of the decorator carriage.

It is to be understood that the form of the cams may be varied within wide limits to secure different forms of decorations. Also, that the timing of the cams need not be exactly as illustrated in the charts of Figs. 30 to 35. Those charts will serve to indicate the principles involved so that those skilled in the art will readily be able to practice the invention not only in the one way herein disclosed, but in various other ways as will readily occur to them.

As mentioned heretofore, it is sometimes advantageous to decorate the confections by the use of a "smeared" plaque. In such case the scrapers would not remove all chocolate from the plaque but would merely control the thickness of the layer of chocolate. Chocolate may be applied to the plaque for this purpose in any suitable way but usually enough chocolate is picked up from the coatings of the confections so that after a few operations the plaque will be covered with a layer of chocolate of the desired thickness. The chocolate, thus picked up, will of course be spread by the scrape into an even layer. The heating means 65 is then of the utmost importance because the chocolate must be prevented from solidifying on the plaque and must be kept in a thoroughly plastic and workable condition. An important advantage of the smeared plaque is that it compensates for inequalities in heights of the confections. For example, the plaque 26 might properly contact with one confection and not with another but if the plaque is covered with chocolate, the coating of the second confection would be touched by the layer of chocolate on the plaque even though it would not be touched by the plaque itself.

The invention provides a decorating apparatus which by its various adjustments is flexible to meet a wide range of conditions and to enable a wide variation in the size and shape of the decorations to be produced. Circles of various diameters, ellipses of various sizes and other closed loop figures may be produced by the machine shown, and by changing cams almost any style of decoration can be produced. With the apparatus shown, confections of any of the usual sizes and shapes may be decorated, the apparatus being adjustable for confections of various heights and to produce decorations of various sizes. For example, the same apparatus can be set to produce a large circular decoration on a large chocolate peppermint patty or it can be set to produce a long narrow elliptical decoration on a chocolate coated nougatine, or other pieces which are much longer than they are wide.

The invention has been disclosed herein, in an embodiment at present preferred, for illustrative purposes but the scope of the invention is defined by the appended claims rather than by the foregoing description.

What I claim is:

1. In combination, a conveyer for carrying confections while their coatings are plastic and workable, a frame mounted in overlying relation with said member, a flexible plaque reciprocably mounted in said frame, means for moving said frame to carry said plaque toward and into contact with the underlying confections on said conveyer and then away from the same to draw out strings from the plastic coatings thereof, means for moving said frame in a horizontal plane while the strings remain attached to said plaque for the purpose of shaping the strings and laying them upon the confections in decorative shapes, means for intermittently moving said plaque operable to move the same relatively to said frame between successive applications of said plaque to the confections, and a scraper carried by said frame and in operative relation to said plaque to remove superfluous coating therefrom when the plaque is moved relatively to its frame.

2. In combination, a conveyer for carrying confections while their coatings are plastic and workable, a decorator frame mounted in overlying relation with said conveyer for movement toward and away from the latter and for movement in various paths in a horizontal plane, a pair of rolls carried by said frame, a flexible plaque trained over said rolls and so disposed that the portion between said rolls engages the confections when said frame is moved toward the conveyer, a device mounted on said frame in operative relation to said plaque for removing superfluous coating adhering thereto, said means operable between successive applications of said portion of the plaque to the confections to move the plaque on its rolls sufficiently to cause said portion thereof to be traversed by said device.

3. In combination, a conveyer for carrying confections while their coatings are plastic and workable, a decorator frame mounted in overlying relation with said conveyer for movement toward and away from the latter and for movement in various paths in a horizontal plane, a pair of rolls carried by said frame, a flexible plaque trained over said rolls and so disposed that the portion between said rolls engages the confections when said frame is moved toward the conveyer, a device mounted on said frame in operative relation to said plaque for removing superfluous coating adhering thereto, means operable between successive applications of said portion of the plaque to the confections to move the plaque on its rolls sufficiently to cause said portion thereof to be traversed by said device and to then move it back into its normal position, and means adjacent said plaque and near said device for preventing the superfluous coating removed by said device from travelling back with the plaque when the latter is moved back into normal position.

4. In combination, a conveyer for carrying confections while their coatings are plastic and workable, a decorator frame mounted in overlying relation with said conveyer for movement toward and away from the latter and for movement in various paths in a horizontal plane, a pair of rolls carried by said frame, a flexible plaque trained over said rolls and so disposed that the portion between said rolls engages the confections when said frame is moved toward the conveyer, a scraper mounted in said frame in operative relation to said plaque and beyond said rolls, a wire stretched across said frame at a location near the scraper and extending transversely across the plaque in close proximity thereto, and means operable during successive applications of said plaque to the confections to move said plaque sufficiently to cause said portion thereof to be traversed by said scraper and subsequently back again into normal position, said wire preventing the mass of coating removed by the scraper and piled up thereagainst from being carried back with the plaque when it is moved back into normal position.

5. In apparatus of the class described, a movable confection decorating element, comprising a frame, rolls mounted therein, a flexible plaque mounted like a belt on said rolls, and presenting a lower stretch between said rolls for engaging the confections, such stretch being free to yield upwardly when engaged by the confections, intermittently-operable means for moving the belt-like plaque relatively to said frame operable between successive applications of the plaque to the confections, and means mounted on said frame for removing superfluous coating from said plaque during movement thereof by said means.

6. In apparatus of the class described, a movable decorating unit comprising, a carriage composed of end members, side members interconnecting the end members and adjustable to vary the spacing therebetween, and track-engaging means mounted on each side member, rolls mounted in said end members, a flexible plaque trained over said rolls in belt form, clamping members extending crosswise of said belt in its upper stretch and engaging the same therebetween, side rails extending between the end members and disposed one on each side of said belt and on which the end of one of said members is slidably supported, and driving means secured to said clamping means for moving said belt on its rolls.

7. In combination, a conveyer for carrying confections while their outer surfaces are plastic and workable, a decorator frame mounted above said conveyer for movement toward and away from the same and also transversely and longitudinally thereof, a decorating plaque mounted like a belt in said frame, means on said frame operable when the plaque is moved relatively to the frame to remove superfluous coating therefrom, and a stationarily-supported and intermittently operable drive shaft, a belt clamped at one point to said plaque and driven from said shaft, and guiding and supporting means for said last named belt for enabling said frame to be moved while maintaining a driving engagement with said plaque.

8. In combination a conveyer for carrying confections while their coatings are plastic and workable, a decorator frame mounted in overlying relation with said conveyer for movement toward and away from the latter and for movement in various paths in a horizontal plane, a pair of rolls carried by said frame, a flexible plaque trained over said rolls and so disposed that the portion between said rolls engages the confections when said frame is moved toward the conveyer, a scraper stationarily mounted in said frame in operative relation to said plaque, a second scraper mounted on said frame to move into and out of operative relation to said plaque, means operable in the interval between successive applications of said plaque to the confections and while the second scraper is out of operative relation to said plaque to move the plaque to cause said portion thereof to be transversed by the first scraper and subsequently operable to move the plaque back into its original position, and means for moving the second scraper into operative relation to the plaque before the plaque is moved back into normal position and for moving it out of operative relation with the plaque before the plaque is again moved to be traversed by the first scraper, said second scraper when in operative relation to said plaque being located adjacent the first scraper and in position to prevent the coating removed by the first scraper from being carried back by the plaque when the latter is restored to its original position.

9. In combination, a conveyer for carrying freshly coated confections, a plaque-like decorating member overlying said conveyer and so adjusted that when it occupies its extreme lower position it will contact with the underlying confections on said conveyer, intermittently operable means for lowering said member to simultaneously engage the underlying confections on said conveyer and for subsequently raising the same to draw out decorative strings from the plastic coatings of the confections, and means operable when said member occupies said lower position to vary the extent of the movement imparted by the first named means and without displacement of said member from the lower position to which it has been adjusted.

10. In combination, a conveyer for carrying freshly coated confections, a plaque-like decorating member overlying said conveyer, intermittently operable means for lowering said member to simultaneously engage the underlying confections on said conveyer and for subsequently raising the same to draw out decorative strings from the plastic coatings of the confections, means for moving said member in a plane substantially parallel with the confection-carrying stretch of said conveyer while said strings remain attached to said member, and means for varying the time of contact of said member relatively to the last named means.

11. In combination, a conveyer for carrying freshly coated confections, a plaque-like decorating member overlying said conveyer, intermittently operable means for lowering said member to simultaneously engage the underlying confections on said conveyer and for subsequently raising the same to draw out decorative strings from the plastic coatings of the confections, means for moving said member in a plane substantially parallel with the confection-carrying stretch of said conveyer while said strings remain attached to said member, said last named means including devices connected to said member for moving it back and forth in a direction longitudinally of said conveyer and other devices for moving it back and forth in a direction transversely of said conveyer, and conveniently operable means one for each set of devices and operable the one independently of the other for varying the stroke of said longitudinal and transverse movements, whereby decorations of various shapes may be effected.

12. In combination, a conveyer for carrying freshly coated confections, a plaque-like decorating member overlying said conveyer, intermittently operable means for lowering said member to simultaneously engage the underlying confections on said conveyer and for subsequently raising the same to draw out decorative strings from the plastic coatings of the confections, and mechanism for moving said member back and forth in a direction parallel to that of the travel of said conveyer, said mechanism including means for moving said member at uniform speed during its travel in the same direction as said conveyer and at the same speed thereof and a separate means operable to accelerate or retard said member relative to the uniform speed produced by the last named means.

13. In combination, a conveyer for carrying freshly coated confections, a plaque-like decorating member overlying said conveyer, intermittently operable means for lowering said member to simultaneously engage the underlying confections on said conveyer and for subsequently raising the same to draw out decorative strings from the plastic coatings of the confections, and mechanism for moving said member back and forth in a direction parallel to that of the travel of said conveyer, said mechanism including a shaft driven in timed relation with said conveyer, means on said shaft and connections from said means to said member for moving said member in the same direction and at the same speed as said conveyer, said connections including two parts which are relatively movable in a direction parallel to that of said conveyer, and means on said shaft controlling the relative movement of said parts and operable at certain times to hold them against relative movement whereby said member is moved in said direction solely by the last named means and operable at other times to move said parts the one relatively to the other to accelerate or retard the speed of said member in said direction.

14. In combination, a conveyer for carrying freshly coated confections, a plaque-like decorating member overlying said conveyer, intermittently operable means for lowering said member to simultaneously engage the underlying confections on said conveyer and for subsequently raising the same to draw out decorative strings from the plastic coatings of the confections, and mechanism for moving said member back and forth in a direction parallel to that of the travel of said conveyer, said mechanism including a drive shaft driven in timed relation with said conveyer, an operating member mounted to move back and forth in a direction substantially parallel to that of the travel of said conveyer, a shaft mounted in said member, an arm fixed to the shaft, connections between said arm and decorating member, means on said drive shaft for operating said member, and another means on said drive shaft for controlling the movement of the shaft carried by such member, holding the same against movement at certain times and at other times moving it in one direction or the other to advance or retard the movement of the decorating member with respect to the movement of said operating member.

15. In combination, a conveyer for carrying freshly coated confections, a plaque-like decorating member overlying said conveyer, intermittently operable means for lowering the plaque into contact with the underlying confections and for raising the same to draw out strings from the plastic coatings thereof, and means for moving the plaque in the same direction and at the same speed as said conveyer during the interval immediately preceding its contact with the confections, during such contact and during the interval immediately ensuing and for then holding the plaque stationary for an interval while the plaque continues to rise, whereby the strings drawn out from the confections will be worked rearwardly thereof, and for then again moving the plaque in said direction and at said speed.

16. In combination, a conveyer for carrying freshly coated confections, a plaque-like decorating member overlying said conveyer, intermittently operable means for lowering the plaque into contact with the underlying confections and for raising the same to draw out strings from the plastic coatings thereof, means for moving the plaque in the same direction and at the same speed as said conveyer during the interval immediately preceding its contact with the confections, during such contact and during the interval immediately ensuing and for then holding the plaque stationary for an interval while the plaque continues to rise, whereby the strings drawn out from the confections will be worked rearwardly thereof, and for then again moving the plaque in said direction and at said speed, and means for varying the extent of said interval.

17. In combination, a conveyer for carrying freshly coated confections, a plaque-like decorating member overlying said conveyer, intermittently operable means for lowering the plaque into contact with the underlying confections and for raising the same to draw out strings from the plastic coatings thereof, means for moving the plaque in the same direction and at the same speed as said conveyer during the interval immediately preceding its contact with the confections, during such contact and during the interval immediately ensuing and for then holding the plaque stationary for an interval while the plaque continues to rise, whereby the strings drawn out from the confections will be worked rearwardly thereof, and for then again moving the plaque in said direction and at said speed, and means for varying the extent of said interval and maintaining the same relationship between the time of contact of the plaque with the confections and the start of said interval.

18. Apparatus for decorating confections, comprising in combination with a conveyer for carrying confections while their outer surfaces are plastic and workable, a plaque-like decorating member overlying a portion of said conveyer, intermittently operable means for lowering said member into simultaneous and adhesive contact with the plastic outer surfaces of a plurality of confections on said conveyer and for subsequently raising said member to draw a portion of the plastic surfaces of each upwardly into a string, means operable after the raising of said member to move the same relatively to the confections in a path substantially parallel to the plane of the confection carrying surface of the conveyer until the strings break, whereby a portion of each string will fall back and be laid on its confection in decorative form and another portion of each string will remain attached to said member, and means automatically operable in the interval between the breaking of said strings and a subsequent lowering of said member to traverse the entire confection-engaging surface of said member and remove therefrom the superfluous parts of plastic strings adhereing thereto.

19. Apparatus for decorating confections, comprising in combination with a conveyer for carrying confections while their outer surfaces are plastic and workable, a plaque-like decorating member overlying a portion of said conveyer, intermittently operable means for lowering said member into simultaneous and adhesive contact with the plastic outer surfaces of a plurality of confections on said conveyer and for subsequently raising said member to draw a portion of the plastic surfaces of each upwardly into a string, means operable after the raising of said member to move the same relatively to the confections in a path substantially parallel to the plane of the confection carrying surface of the conveyer until the strings break, whereby a portion of each string will fall back and be laid on its confection in decorative form and another portion of each string will remain attached to said member, a scraper mounted adjacent to said member, and means automatically operable in the interval between the breaking of said strings and a subsequent lowering of said member to produce a relative movement between said scraper and member and cause the scraper to traverse the entire confection-engaging surface of said member.

20. Apparatus for decorating confections, comprising in combination with a conveyer for carrying confections while their outer surfaces are plastic and workable, a plaque-like decorating member overlying a portion of said conveyer, intermittently operable means for lowering said member into simultaneous and adhesive contact with the plastic outer surfaces of a plurality of confections on said conveyer and for subsequently raising said member to draw a portion of the plastic surfaces of each upwardly into a string, means operable after the raising of said member to move the same relatively to the confections in a path substantially parallel to the plane of the confection carrying surface of the conveyer until the strings break, whereby a portion of each string will fall back and be laid on its confection in decorative form and another portion of each string will remain attached to said member, and means for locally heating the confection engaging portion of said member to prevent the portions of the strings adhering thereto from hardening.

ALONZO LINTON BAUSMAN.